(12) United States Patent
Lim et al.

(10) Patent No.: US 11,902,864 B2
(45) Date of Patent: Feb. 13, 2024

(54) METHOD AND DEVICE FOR IDENTIFYING PACKET IN WIRELESS COMMUNICATION SYSTEM

(71) Applicant: LG ELECTRONICS INC., Seoul (KR)

(72) Inventors: Dongguk Lim, Seoul (KR); Jinsoo Choi, Seoul (KR); Eunsung Park, Seoul (KR); Insun Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 367 days.

(21) Appl. No.: 17/427,255

(22) PCT Filed: Nov. 27, 2019

(86) PCT No.: PCT/KR2019/016451
§ 371 (c)(1),
(2) Date: Jul. 30, 2021

(87) PCT Pub. No.: WO2020/159059
PCT Pub. Date: Aug. 6, 2020

(65) Prior Publication Data
US 2022/0124467 A1 Apr. 21, 2022

(30) Foreign Application Priority Data

Feb. 1, 2019 (KR) .................. 10-2019-0013455
May 1, 2019 (KR) .................. 10-2019-0051159
(Continued)

(51) Int. Cl.
*H04W 4/40* (2018.01)
*H04L 27/26* (2006.01)
(Continued)

(52) U.S. Cl.
CPC .......... *H04W 4/40* (2018.02); *H04L 27/26025* (2021.01); *H04W 80/02* (2013.01); *H04W 84/12* (2013.01)

(58) Field of Classification Search
CPC .......... H04W 84/12; H04W 4/40; H04W 4/80; H04W 80/02; H04W 72/04; H04W 4/46;
(Continued)

(56) References Cited

U.S. PATENT DOCUMENTS

2012/0269124 A1 10/2012 Porat
2016/0080056 A1* 3/2016 Porat .................. H04B 7/06
370/329
(Continued)

FOREIGN PATENT DOCUMENTS

KR 10-2016-0034853 3/2016
KR 10-2017-0107498 9/2017

OTHER PUBLICATIONS

Marvell, NGV MAC Discussions, IEEE 802.11-18/1249r1, Jul. 12, 2018, see pp. 3-4.
(Continued)

*Primary Examiner* — Allahyar Kasraian
(74) *Attorney, Agent, or Firm* — BRYAN CAVE LEIGHTON PAISNER LLP

(57) ABSTRACT

An example according to the present specification relates to a technique for identifying a wireless LAN (WLAN) packet. An NGV PPDU may include a first legacy control field and a second legacy control field. The second legacy control field may be used to identify a type of a PPDU. The first legacy control field may be received through a first symbol, and the second legacy control field may be received through a second symbol. The first legacy control field and the second legacy control field may include identical bit information.

16 Claims, 32 Drawing Sheets

(30) Foreign Application Priority Data

Aug. 12, 2019 (KR) .......................... 10-2019-0098198
Sep. 11, 2019 (KR) .......................... 10-2019-0113150

(51) Int. Cl.
*H04W 80/02* (2009.01)
*H04W 84/12* (2009.01)

(58) Field of Classification Search
CPC ... H04W 72/0453; H04W 80/00; H04W 4/44; H04L 27/2603; H04L 27/2602; H04L 27/26025
See application file for complete search history.

(56) References Cited

U.S. PATENT DOCUMENTS

| | | | |
|---|---|---|---|
| 2019/0045444 A1* | 2/2019 | Huang | H04W 76/28 |
| 2020/0008201 A1* | 1/2020 | Kenney | H04W 72/0453 |
| 2020/0178120 A1* | 6/2020 | Sugaya | H04W 74/0808 |
| 2021/0050962 A1* | 2/2021 | Yu | H04L 5/0091 |
| 2021/0258407 A1* | 8/2021 | Lim | H04L 69/22 |
| 2023/0269120 A1* | 8/2023 | Yu | H04L 5/0044 370/329 |

OTHER PUBLICATIONS

Sassi, Aymen et al., OFDM Transmission Performance Evaluation V2X Communication, UCSI International Journal of Computer Science Issues, vol. 9, Issue 2, No. 3, Oct. 29, 2014, see section 2.

* cited by examiner

FIG. 2
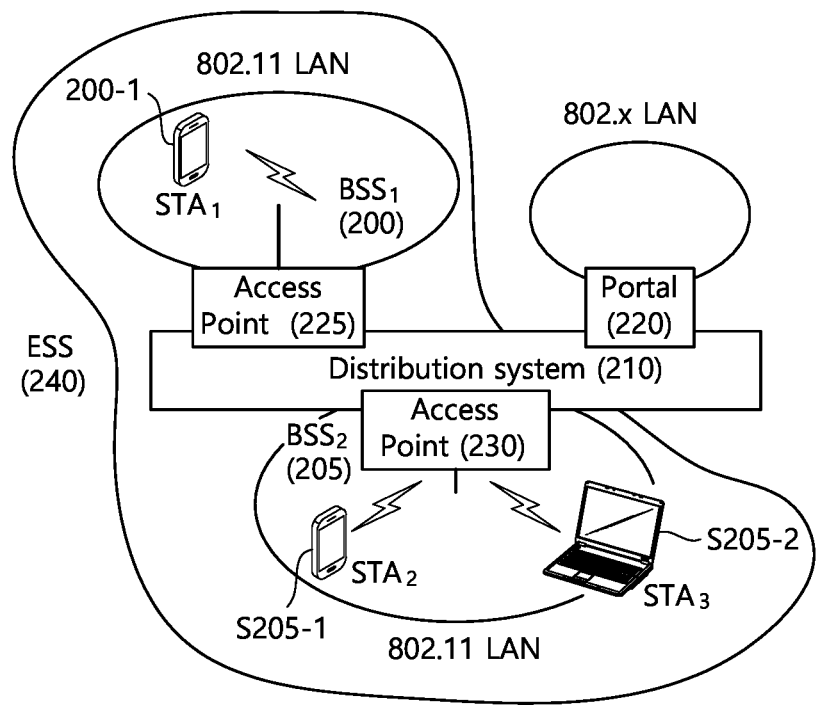
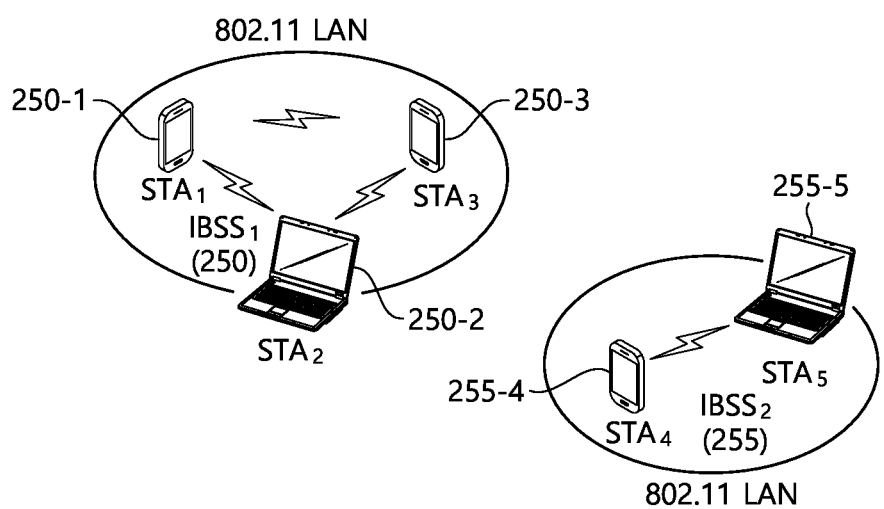

FIG. 4
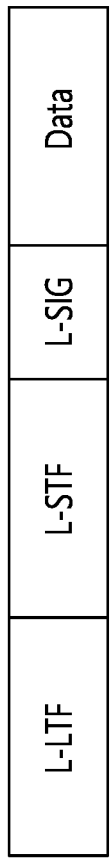
PPDU Format (IEEE 802.11a/g)
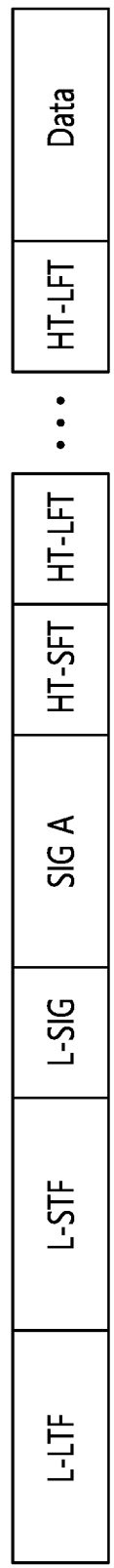
HT PPDU Format (IEEE 802.11n)
VHT PPDU Format (IEEE 802.11ac)
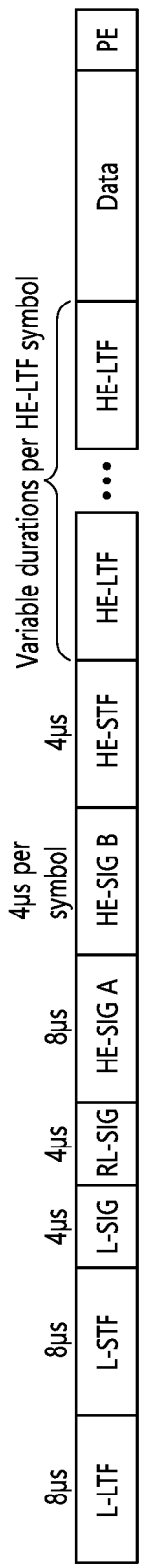

FIG. 18

| 8µs | 8µs | 4µs | 4µs | | | | | | |
|---|---|---|---|---|---|---|---|---|---|
| L-LTF | L-STF | L-SIG | RL-SIG | SIG A | SIG B | STF | LTF | Data | PE |

METHOD AND DEVICE FOR IDENTIFYING PACKET IN WIRELESS COMMUNICATION SYSTEM

This application is the National Stage filing under 35 U.S.C. 371 of International Application No. PCT/KR2019/016451 filed on Nov. 27, 2019, which claims priority to Korean Patent Application Nos. 10-2019-0013455 filed on Feb. 1, 2019; 10-2019-0051159 filed on May 1, 2019; 10-2019-0098198 filed on Aug. 12, 2019 and 10-2019-0113150 filed on Sep. 11, 2019, the contents of which are all hereby incorporated by reference herein in their entirety.

BACKGROUND OF THE DISCLOSURE

Field of the Disclosure

The present specification relates to a technique for transmitting and receiving data in a wireless communication, and more particularly, to a method and apparatus for configuring and receiving a packet having an identifiable type in a wireless LAN system.

Related Art

Wireless network technologies may include various types of wireless local area networks (WLANs). The WLAN employs widely used networking protocols and can be used to interconnect nearby devices together. The various technical features described herein may be applied to any communication standard, such as WiFi or, more generally, any one of the IEEE 802.11 family of wireless protocols.

The present specification proposes technical features to improve the conventional IEEE 802.11p standard and technical features usable in a new communication standard. The new communication standard may be a Next Generation Vehicular (NGV) standard that is being discussed recently.

Meanwhile, in the IEEE standard, various types or formats of Physical Protocol Data Units (PPDUs) are defined. The transmitting/receiving station (STA) has used an auto-detection rule to identify the type/format of the PPDU to be transmitted/received.

Technical Objective

As a new wireless LAN standard is discussed, it is necessary to discuss a method and apparatus for identifying a new type of packet. Since backward compatibility should be supported in the WLAN system, a new packet type must be easily distinguished from a conventional packet. The present specification proposes a method/device for constructing a new type of packet and a method/device for determining whether a received packet is a new type of packet.

Specifically, for smooth Vehicle-to-Everything (V2X) support in a 5.9 GHz band, technology development for Next Generation Vehicular (NGV) is in progress considering throughput improvement and coverage extension of DSRC (802.11p standard). An NGV signal (i.e., a signal according to the 802.11bd standard) may be transmitted to support one of modes for throughput improvement and coverage extension. Therefore, the NGV signal may be transmitted in one or more modes. Also, according to various modes, signals may be transmitted using different frame formats. The receiving device may need to classify the received signal and check the mode. The present specification proposes a method for performing a packet classification and a mode indication for an NGV signal when transmitting and receiving the NGV signal.

SUMMARY

An example according to the present specification relates to a method and/or apparatus for identifying a packet in a wireless communication system.

The STA according to an example of the present specification may receive an NGV Physical Protocol Data Unit (PPDU) including a legacy training field, a first legacy control field, a second legacy control field, a Next Generation Vehicular network (NGV) control field, and an NGV data field.

The STA according to an example of the present specification may decode the NGV PPDU.

The NGV PPDU according to an example of the present specification may be received through a 5.9 GHz band based on a frequency spacing of 156.25 kHz.

The STA according to an example of the present specification may receive the first legacy control field through the first symbol.

The second legacy control field according to an example of the present specification may be received through a second symbol.

According to an example of the present specification, the first symbol may be consecutive to the second symbol.

According to an example of the present specification, the first legacy control field and the second legacy control field may include the same bit information.

The present specification proposes technical features supporting a situation in which the 5.9 GHz band is used in various WLAN systems (e.g., IEEE 802.11bd systems). Based on various examples of the present specification, throughput improvement and high speed of Dedicated Short Range Communication (802.11p) may be supported for smooth V2X support in the 5.9 GHz band.

Specifically, an example according to the present specification can easily configure a newly defined packet in a WLAN system and easily identify/detect the newly defined packet. An example of the present specification may enable efficient coexistence of the newly defined packet and the conventional packet.

BRIEF DESCRIPTION OF THE DRAWINGS

FIG. 2 is a conceptual view illustrating the structure of a wireless local area network (WLAN).

FIG. 4 illustrates an example of a PPDU used in an IEEE standard.

FIG. 18 illustrates an example of a PPDU used in the present specification.

DESCRIPTION OF EXEMPLARY EMBODIMENTS

Figure 1:
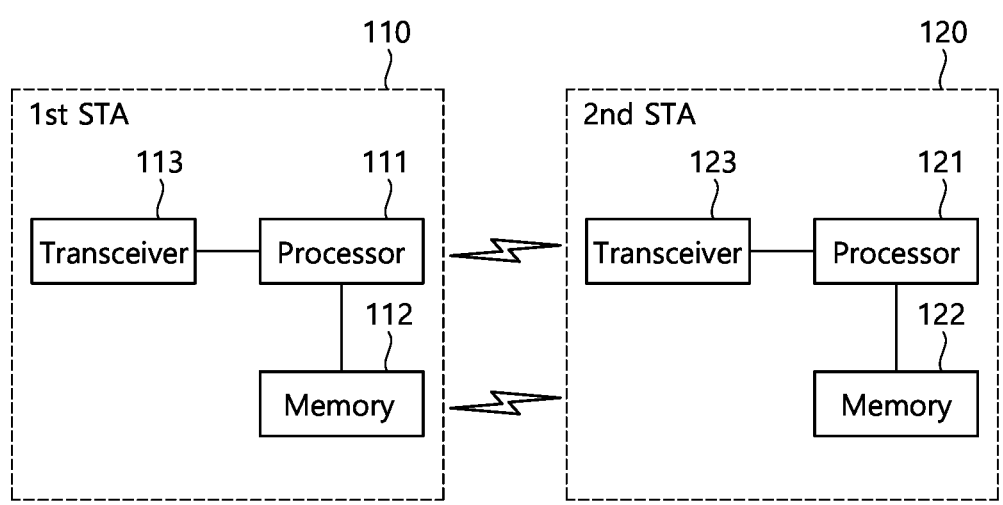
FIG. 1 shows an example of a transmitting apparatus and/or receiving apparatus of the present specification.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP. In the present specification, the AP may be indicated as an AP STA.

The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, an STA1, an STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

FIG. 2 is a conceptual view illustrating the structure of a wireless local area network (WLAN).

An upper part of FIG. 2 illustrates the structure of an infrastructure basic service set (BSS) of institute of electrical and electronic engineers (IEEE) 802.11.

Referring the upper part of FIG. 2, the wireless LAN system may include one or more infrastructure BSSs 200 and 205 (hereinafter, referred to as BSS). The BSSs 200 and 205 as a set of an AP and a STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (IEEE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

Figure 3:
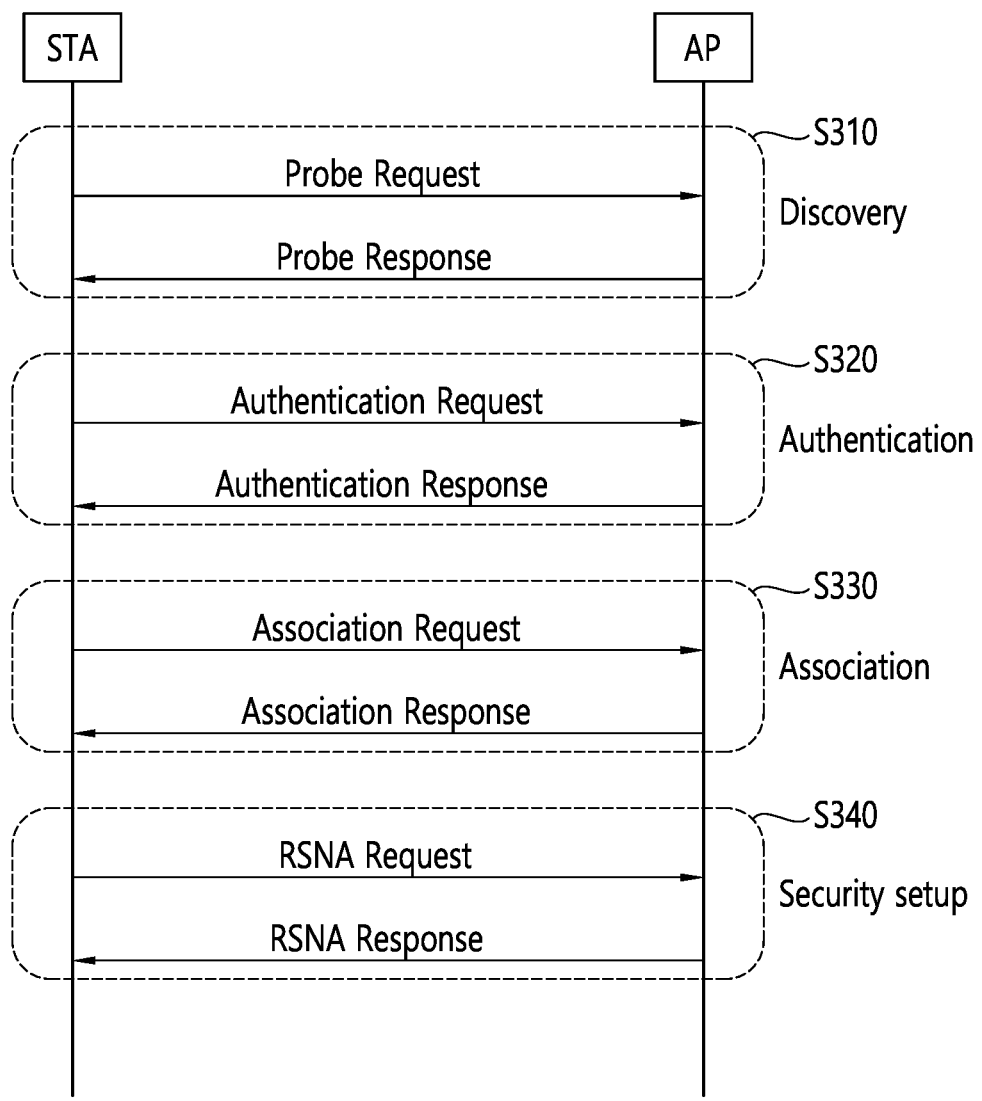
FIG. 3 illustrates a general link setup process.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information about a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/ response are management frames.

The authentication frames may include information about an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information about various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information about various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

FIG. 4 illustrates an example of a PPDU used in an IEEE standard.

As illustrated, various types of PHY protocol data units (PPDUs) are used in IEEE a/g/n/ac standards. Specifically, an LTF and a STF include a training signal, a SIG-A and a SIG-B include control information for a receiving STA, and a data field includes user data corresponding to a PSDU (MAC PDU/aggregated MAC PDU).

FIG. 4 also includes an example of an HE PPDU according to IEEE 802.11ax. The HE PPDU according to FIG. 4 is an illustrative PPDU for multiple users. An HE-SIG-B may be included only in a PPDU for multiple users, and an HE-SIG-B may be omitted in a PPDU for a single user.

As illustrated in FIG. 4, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted for illustrated time periods (i.e., 4 or 8 μs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

Figure 5:
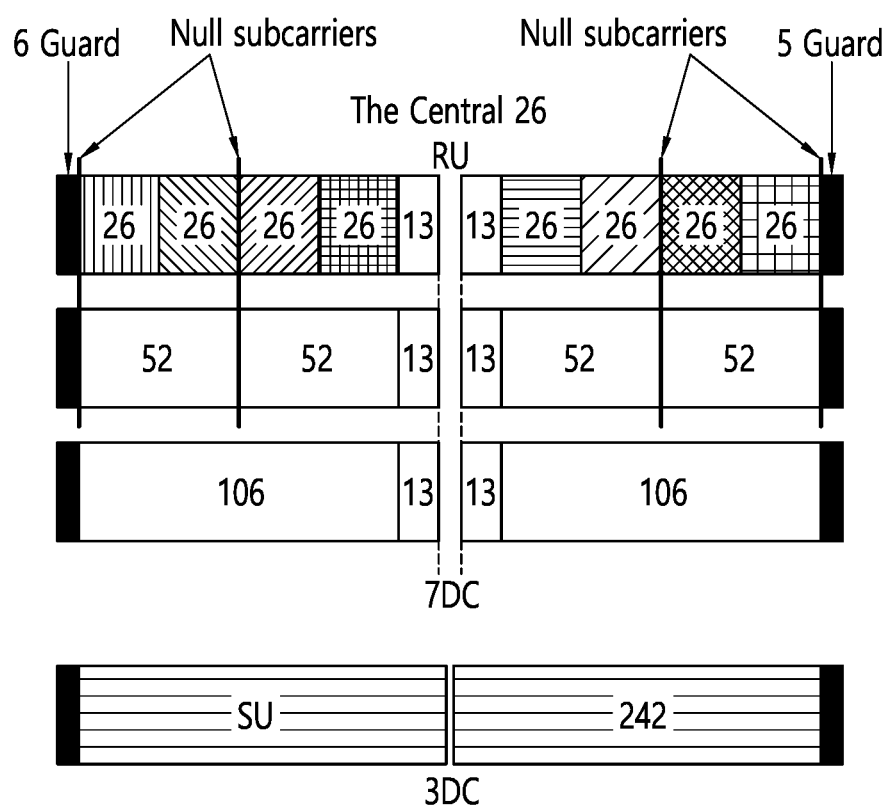
FIG. 5 illustrates a layout of resource units (RUs) used in a band of 20 MHz.

FIG. 5 illustrates a layout of resource units (RUs) used in a band of 20 MHz.

As illustrated in FIG. 5, resource units (RUs) corresponding to different numbers of tones (i.e., subcarriers) may be used to form some fields of an HE-PPDU. For example, resources may be allocated in illustrated RUs for an HE-STF, an HE-LTF, and a data field.

As illustrated in the uppermost part of FIG. 5, a 26-unit (i.e., a unit corresponding to 26 tones) may be disposed. Six tones may be used for a guard band in the leftmost band of the 20 MHz band, and five tones may be used for a guard band in the rightmost band of the 20 MHz band. Further, seven DC tones may be inserted in a center band, that is, a DC band, and a 26-unit corresponding to 13 tones on each of the left and right sides of the DC band may be disposed. A 26-unit, a 52-unit, and a 106-unit may be allocated to other bands. Each unit may be allocated for a receiving STA, that is, a user.

The layout of the RUs in FIG. 5 may be used not only for a multiple users (MUs) but also for a single user (SU), in which case one 242-unit may be used and three DC tones may be inserted as illustrated in the lowermost part of FIG. 5.

Although FIG. 5 proposes RUs having various sizes, that is, a 26-RU, a 52-RU, a 106-RU, and a 242-RU, specific sizes of RUs may be extended or increased. Therefore, the present embodiment is not limited to the specific size of each RU (i.e., the number of corresponding tones).

Figure 6:
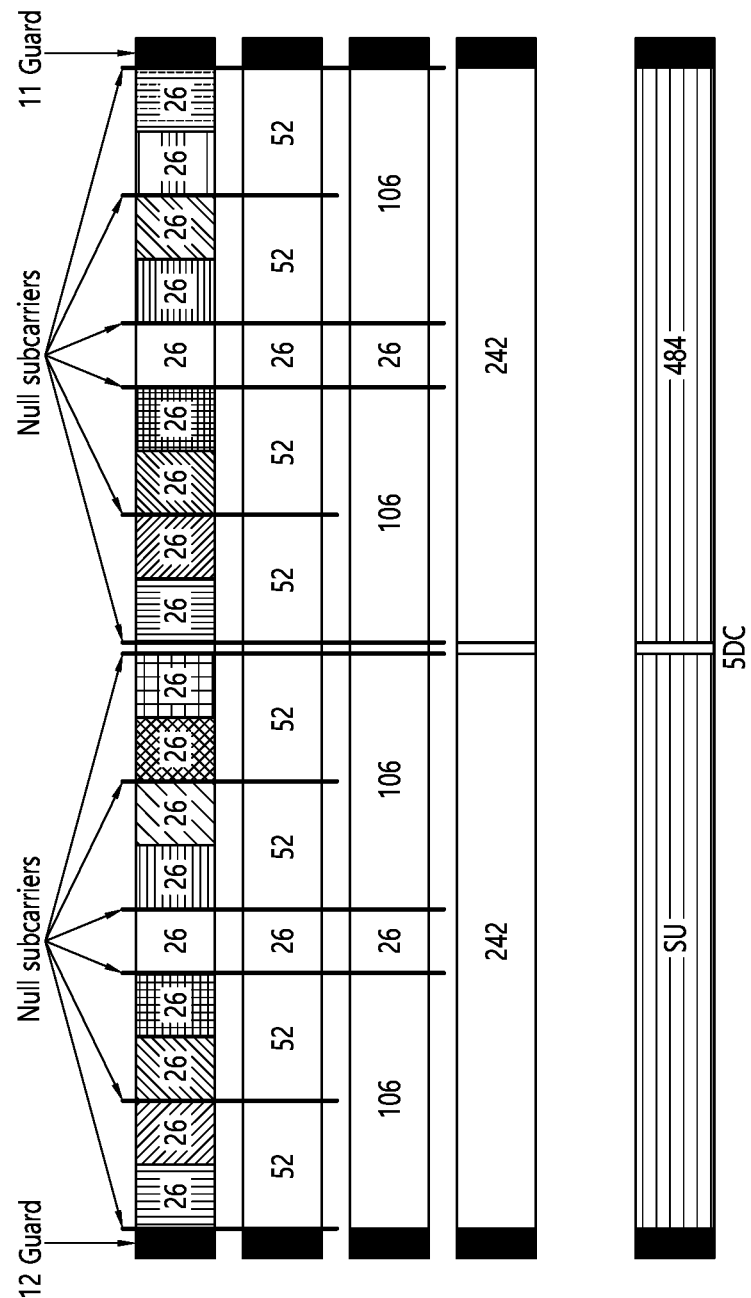
FIG. 6 illustrates a layout of RUs used in a band of 40 MHz.

FIG. 6 illustrates a layout of RUs used in a band of 40 MHz.

Similarly to FIG. 5 in which RUs having various sizes are used, a 26-RU, a 52-RU, a 106-RU, a 242-RU, a 484-RU, and the like may be used in an example of FIG. 6. Further, five DC tones may be inserted in a center frequency, 12 tones may be used for a guard band in the leftmost band of the 40 MHz band, and 11 tones may be used for a guard band in the rightmost band of the 40 MHz band.

As illustrated in FIG. 6, when the layout of the RUs is used for a single user, a 484-RU may be used. The specific number of RUs may be changed similarly to FIG. 5.

Figure 7:
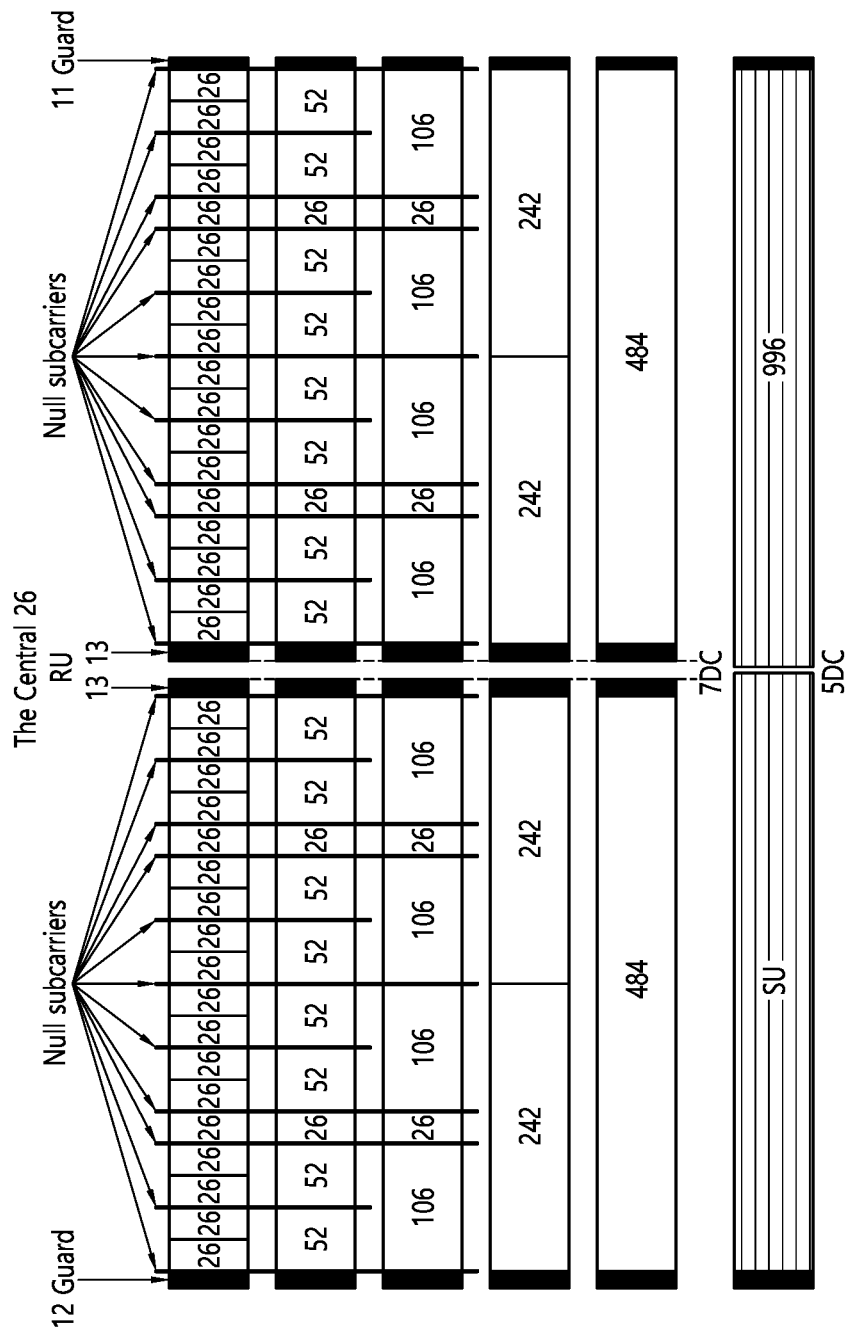
FIG. 7 illustrates a layout of RUs used in a band of 80 MHz.

FIG. 7 illustrates a layout of RUs used in a band of 80 MHz.

Similarly to FIG. 5 and FIG. 6 in which RUs having various sizes are used, a 26-RU, a 52-RU, a 106-RU, a 242-RU, a 484-RU, a 996-RU, and the like may be used in an example of FIG. 7. Further, seven DC tones may be inserted in the center frequency, 12 tones may be used for a guard band in the leftmost band of the 80 MHz band, and 11 tones may be used for a guard band in the rightmost band of the 80 MHz band. In addition, a 26-RU corresponding to 13 tones on each of the left and right sides of the DC band may be used.

As illustrated in FIG. 7, when the layout of the RUs is used for a single user, a 996-RU may be used, in which case five DC tones may be inserted.

In the meantime, the fact that the specific number of RUs can be changed is the same as those of FIGS. 5 and 6.

The RU arrangement (i.e., RU location) shown in FIGS. 5 to 7 can be applied to a new wireless LAN system (e.g. EHT system) as it is. Meanwhile, for the 160 MHz band supported by the new WLAN system, the RU arrangement for 80 MHz (i.e., an example of FIG. 7) may be repeated twice, or the RU arrangement for the 40 MHz (i.e., an example of FIG. 6) may be repeated 4 times. In addition, when the EHT PPDU is configured for the 320 MHz band, the arrangement of the RU for 80 MHz (i.e., an example of FIG. 7) may be repeated 4 times or the arrangement of the RU for 40 MHz (i.e., an example of FIG. 6) may be repeated 8 times.

One RU of the present specification may be allocated for a single STA (e.g., a single non-AP STA). Alternatively, a plurality of RUs may be allocated for one STA (e.g., a non-AP STA).

The RU described in the present specification may be used in uplink (UL) communication and downlink (DL) communication. For example, when UL-MU communication which is solicited by a trigger frame is performed, a transmitting STA (e.g., an AP) may allocate a first RU (e.g., 26/52/106/242-RU, etc.) to a first STA through the trigger frame, and may allocate a second RU (e.g., 26/52/106/242-RU, etc.) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same (or overlapped) time period.

For example, when a DL MU PPDU is configured, the transmitting STA (e.g., AP) may allocate the first RU (e.g., 26/52/106/242-RU, etc.) to the first STA, and may allocate the second RU (e.g., 26/52/106/242-RU, etc.) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

Information related to a layout of the RU may be signaled through HE-SIG-B.

Figure 8:
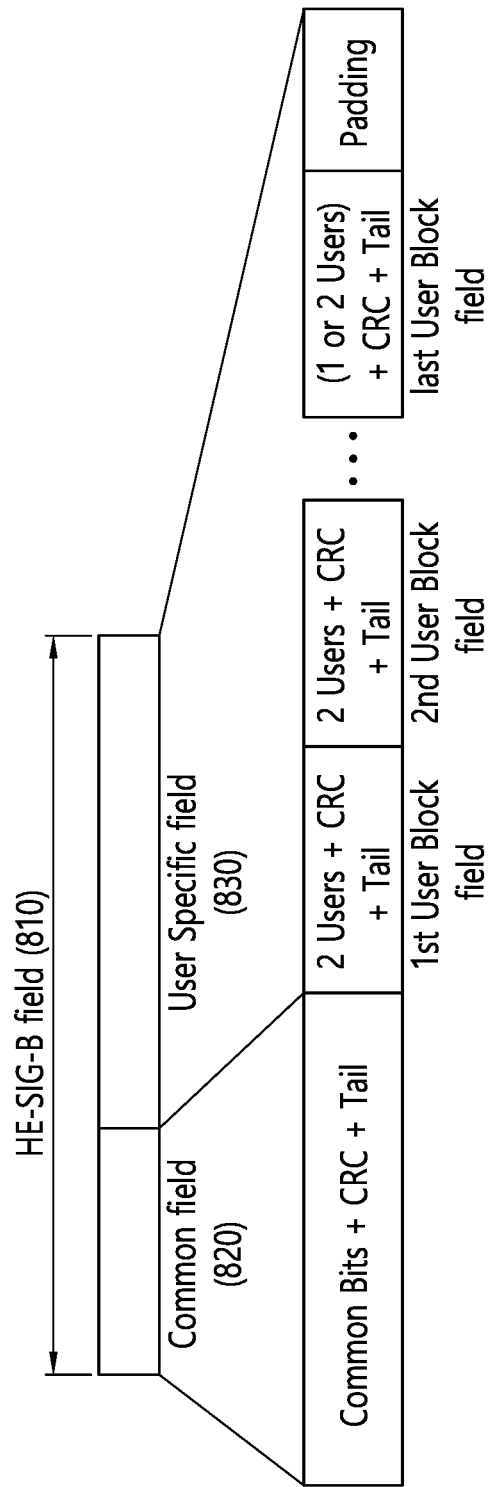
FIG. 8 illustrates a structure of an HE-SIG-B field.

FIG. 8 illustrates a structure of an HE-SIG-B field.

As illustrated, an HE-SIG-B field 810 includes a common field 820 and a user-specific field 830. The common field 820 may include information commonly applied to all users (i.e., user STAs) which receive SIG-B. The user-specific field 830 may be called a user-specific control field. When the SIG-B is transferred to a plurality of users, the user-specific field 830 may be applied only any one of the plurality of users.

As illustrated in FIG. 8, the common field 820 and the user-specific field 830 may be separately encoded.

The common field 820 may include RU allocation information of N*8 bits. For example, the RU allocation information may include information related to a location of an RU. For example, when a 20 MHz channel is used as shown in FIG. 5, the RU allocation information may include information related to a specific frequency band to which a specific RU (26-RU/52-RU/106-RU) is arranged.

An example of a case in which the RU allocation information consists of 8 bits is as follows.

TABLE 1

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 | | 1 |
| 00000010 | 26 | 26 | 26 | 26 | 26 | 52 | | 26 | 26 | 1 |
| 00000011 | 26 | 26 | 26 | 26 | 26 | 52 | | 52 | | 1 |
| 00000100 | 26 | 26 | 52 | | 26 | 26 | 26 | 26 | 26 | 1 |
| 00000101 | 26 | 26 | 52 | | 26 | 26 | 26 | 52 | | 1 |
| 00000110 | 26 | 26 | 52 | | 26 | 52 | | 26 | 26 | 1 |
| 00000111 | 26 | 26 | 52 | | 26 | 52 | | 52 | | 1 |
| 00001000 | 52 | | 26 | 26 | 26 | 26 | 26 | 26 | 26 | 1 |

As shown the example of FIG. 5, up to nine 26-RUs may be allocated to the 20 MHz channel. When the RU allocation information of the common field 820 is set to "00000000" as shown in Table 1, the nine 26-RUs may be allocated to a corresponding channel (i.e., 20 MHz). In addition, when the RU allocation information of the common field 820 is set to "00000001" as shown in Table 1, seven 26-RUs and one 52-RU are arranged in a corresponding channel That is, in the example of FIG. 5, the 52-RU may be allocated to the rightmost side, and the seven 26-RUs may be allocated to the left thereof.

The example of Table 1 shows only some of RU locations capable of displaying the RU allocation information.

For example, the RU allocation information may include an example of Table 2 below.

TABLE 2

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 01000$y_2y_1y_0$ | | 106 | | | 26 | 26 | 26 | 26 | 26 | 8 |
| 01001$y_2y_1y_0$ | | 106 | | | 26 | 26 | 26 | 52 | | 8 |

"01000y2y1y0" relates to an example in which a 106-RU is allocated to the leftmost side of the 20 MHz channel, and five 26-RUs are allocated to the right side thereof. In this case, a plurality of STAs (e.g., user-STAs) may be allocated to the 106-RU, based on a MU-MIMO scheme. Specifically, up to 8 STAs (e.g., user-STAs) may be allocated to the 106-RU, and the number of STAs (e.g., user-STAs) allocated to the 106-RU is determined based on 3-bit information (y2y1y0). For example, when the 3-bit information (y2y1y0) is set to N, the number of STAs (e.g., user-STAs) allocated to the 106-RU based on the MU-MIMO scheme may be N+1.

In general, a plurality of STAs (e.g., user STAs) different from each other may be allocated to a plurality of RUs. However, the plurality of STAs (e.g., user STAs) may be allocated to one or more RUs having at least a specific size (e.g., 106 subcarriers), based on the MU-MIMO scheme.

As shown in FIG. 8, the user-specific field 830 may include a plurality of user fields. As described above, the number of STAs (e.g., user STAs) allocated to a specific channel may be determined based on the RU allocation information of the common field 820. For example, when the RU allocation information of the common field 820 is "00000000", one user STA may be allocated to each of nine 26-RUs (e.g., nine user STAs may be allocated). That is, up to 9 user STAs may be allocated to a specific channel through an OFDMA scheme. In other words, up to 9 user STAs may be allocated to a specific channel through a non-MU-MIMO scheme.

For example, when RU allocation is set to "01000y2y1y0", a plurality of STAs may be allocated to the 106-RU arranged at the leftmost side through the MU-MIMO scheme, and five user STAs may be allocated to five 26-RUs arranged to the right side thereof through the non-MU MIMO scheme. This case is specified through an example of FIG. 9.

and a user field related to a non-MIMO scheme may be configured in a second format. Referring to the example of FIG. 9, a user field 1 to a user field 3 may be based on the first format, and a user field 4 to a user field 8 may be based on the second format. The first format or the second format may include bit information of the same length (e.g., 21 bits).

Each user field may have the same size (e.g., 21 bits). For example, the user field of the first format (the first of the MU-MIMO scheme) may be configured as follows.

For example, a first bit (i.e., B0-B10) in the user field (i.e., 21 bits) may include identification information (e.g., STA-ID, partial AID, etc.) of a user STA to which a corresponding user field is allocated. In addition, a second bit (i.e., B11-B14) in the user field (i.e., 21 bits) may include information related to a spatial configuration. Specifically, an example of the second bit (i.e., B11-B14) may be as shown in Table 3 and Table 4 below.

TABLE 3

| $N_{user}$ | B3 ... B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 2 | 0000-0011 | 1-4 | 1 | | | | | | | 2-5 | 10 |
|  | 0100-0110 | 2-4 | 2 | | | | | | | 4-6 | |
|  | 0111-1000 | 3-4 | 3 | | | | | | | 6-7 | |
|  | 1001 | 4 | 4 | | | | | | | 8 | |
| 3 | 0000-0011 | 1-4 | 1 | 1 | | | | | | 3-6 | 13 |
|  | 0100-0110 | 2-4 | 2 | 1 | | | | | | 5-7 | |
|  | 0111-1000 | 3-4 | 3 | 1 | | | | | | 7-8 | |
|  | 1001-1011 | 2-4 | 2 | 2 | | | | | | 6-8 | |
|  | 1100 | 3 | 3 | 2 | | | | | | 8 | |
| 4 | 0000-0011 | 1-4 | 1 | 1 | 1 | | | | | 4-7 | 11 |
|  | 0100-0110 | 2-4 | 2 | 1 | 1 | | | | | 6-8 | |
|  | 0111 | 3 | 3 | 1 | 1 | | | | | 8 | |
|  | 1000-1001 | 2-3 | 2 | 2 | 1 | | | | | 7-8 | |
|  | 1010 | 2 | 2 | 2 | 2 | | | | | 8 | |

TABLE 4

| $N_{user}$ | B3 ... B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 5 | 0000-0011 | 1-4 | 1 | 1 | 1 | 1 | | | | 5-8 | 7 |
|  | 0100-0101 | 2-3 | 2 | 1 | 1 | 1 | | | | 7-8 | |
|  | 0110 | 2 | 2 | 2 | 1 | 1 | | | | 8 | |
| 6 | 0000-0010 | 1-3 | 1 | 1 | 1 | 1 | 1 | | | 6-8 | 4 |
|  | 0011 | 2 | 2 | 1 | 1 | 1 | 1 | | | 8 | |
| 7 | 0000-0001 | 1-2 | 1 | 1 | 1 | 1 | 1 | 1 | | 7-8 | 2 |
| 8 | 0000 | 1 | 1 | 1 | 1 | 1 | 1 | 1 | 1 | 8 | 1 |

Figure 9:
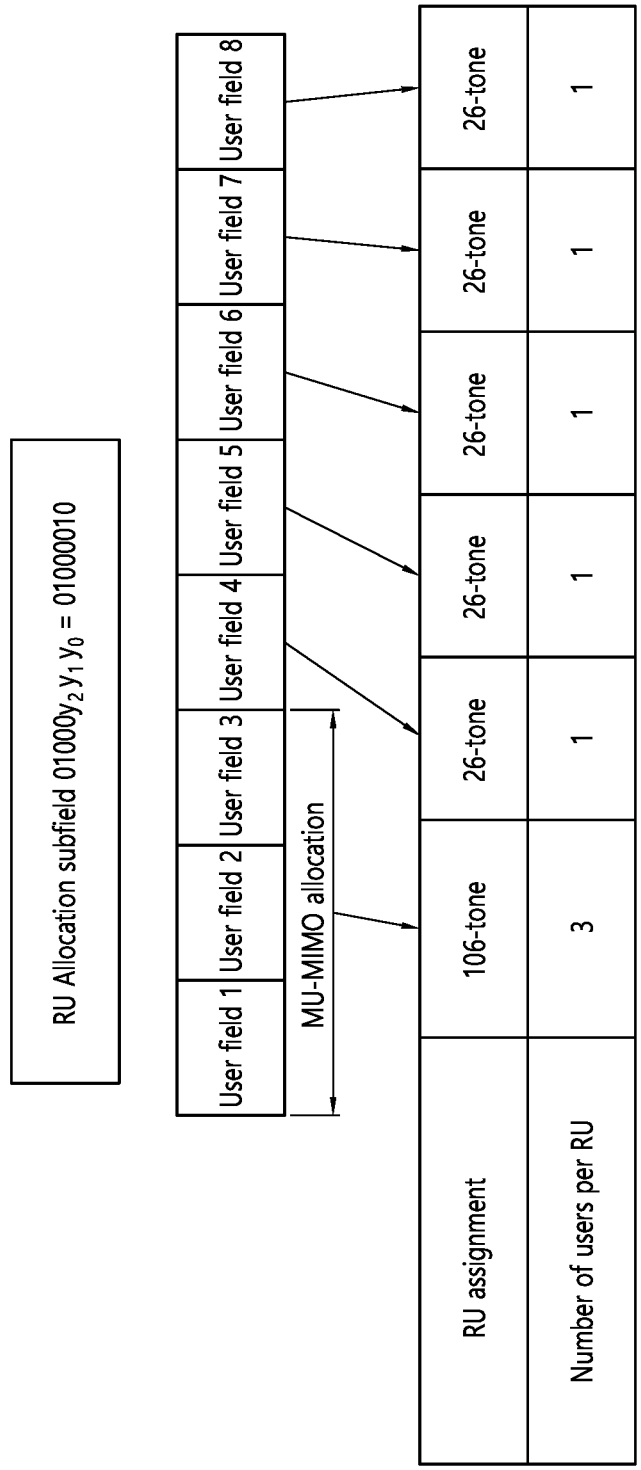
FIG. 9 illustrates an example in which a plurality of user STAs are allocated to the same RU through a MU-MIMO scheme.

FIG. 9 illustrates an example in which a plurality of user STAs are allocated to the same RU through a MU-MIMO scheme.

For example, when RU allocation is set to "01000010" as shown in FIG. 9, a 106-RU may be allocated to the leftmost side of a specific channel, and five 26-RUs may be allocated to the right side thereof. In addition, three user STAs may be allocated to the 106-RU through the MU-MIMO scheme. As a result, since eight user STAs are allocated, the user-specific field 830 of HE-SIG-B may include eight user fields.

The eight user fields may be expressed in the order shown in FIG. 9. In addition, as shown in FIG. 8, two user fields may be implemented with one user block field.

The user fields shown in FIG. 8 and FIG. 9 may be configured based on two formats. That is, a user field related to a MU-MIMO scheme may be configured in a first format, As shown in Table 3 and/or Table 4, the second bit (e.g., B11-B14) may include information related to the number of spatial streams allocated to the plurality of user STAs which are allocated based on the MU-MIMO scheme. For example, when three user STAs are allocated to the 106-RU based on the MU-MIMO scheme as shown in FIG. 9, N_user is set to "3". Therefore, values of N_STS[1], N_STS[2], and N_STS[3] may be determined as shown in Table 3. For example, when a value of the second bit (B11-B14) is "0011", it may be set to N_STS[1]=4, N_STS[2]=1, N_STS[3]=1. That is, in the example of FIG. 9, four spatial streams may be allocated to the user field 1, one spatial stream may be allocated to the user field 1, and one spatial stream may be allocated to the user field 3.

As shown in the example of Table 3 and/or Table 4, information (i.e., the second bit, B11-B14) related to the number of spatial streams for the user STA may consist of 4 bits. In addition, the information (i.e., the second bit, B11-B14) on the number of spatial streams for the user STA may support up to eight spatial streams. In addition, the information (i.e., the second bit, B11-B14) on the number of spatial streams for the user STA may support up to four spatial streams for one user STA.

In addition, a third bit (i.e., B15-18) in the user field (i.e., 21 bits) may include modulation and coding scheme (MCS) information. The MCS information may be applied to a data field in a PPDU including corresponding SIG-B.

An MCS, MCS information, an MCS index, an MCS field, or the like used in the present specification may be indicated by an index value. For example, the MCS information may be indicated by an index 0 to an index 11. The MCS information may include information related to a constellation modulation type (e.g., BPSK, QPSK, 16-QAM, 64-QAM, 256-QAM, 1024-QAM, etc.) and information related to a coding rate (e.g., 1/2, 2/3, 3/4, 5/6e, etc.). Information related to a channel coding type (e.g., LCC or LDPC) may be excluded in the MCS information.

In addition, a fourth bit (i.e., B19) in the user field (i.e., 21 bits) may be a reserved field.

In addition, a fifth bit (i.e., B20) in the user field (i.e., 21 bits) may include information related to a coding type (e.g., BCC or LDPC). That is, the fifth bit (i.e., B20) may include information related to a type (e.g., BCC or LDPC) of channel coding applied to the data field in the PPDU including the corresponding SIG-B.

The aforementioned example relates to the user field of the first format (the format of the MU-MIMO scheme). An example of the user field of the second format (the format of the non-MU-MIMO scheme) is as follows.

A first bit (e.g., B0-B10) in the user field of the second format may include identification information of a user STA. In addition, a second bit (e.g., B11-B13) in the user field of the second format may include information related to the number of spatial streams applied to a corresponding RU. In addition, a third bit (e.g., B14) in the user field of the second format may include information related to whether a beamforming steering matrix is applied. A fourth bit (e.g., B15-B18) in the user field of the second format may include modulation and coding scheme (MCS) information. In addition, a fifth bit (e.g., B19) in the user field of the second format may include information related to whether dual carrier modulation (DCM) is applied. In addition, a sixth bit (i.e., B20) in the user field of the second format may include information related to a coding type (e.g., BCC or LDPC).

Figure 10:
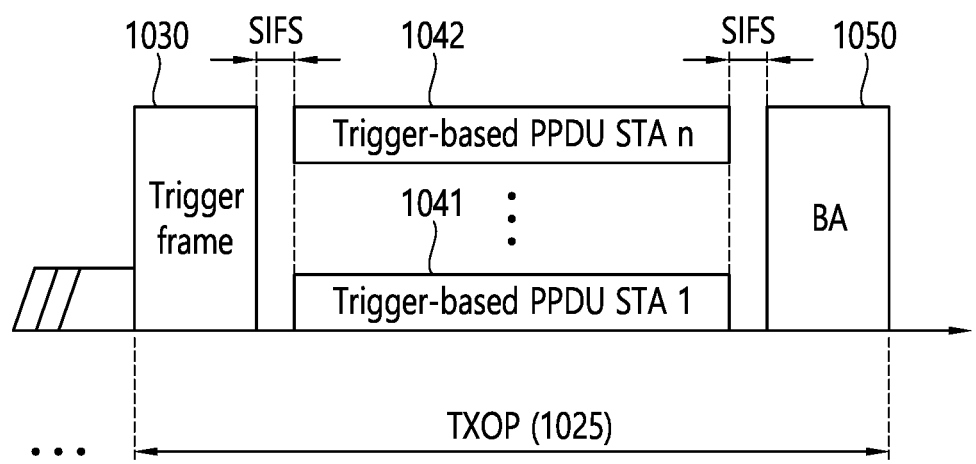
FIG. 10 illustrates an operation based on UL-MU.

FIG. 10 illustrates an operation based on UL-MU. As illustrated, a transmitting STA (e.g., an AP) may perform channel access through contending (e.g., a backoff operation), and may transmit a trigger frame 1030. That is, the transmitting STA may transmit a PPDU including the trigger frame 1030. Upon receiving the PPDU including the trigger frame, a trigger-based (TB) PPDU is transmitted after a delay corresponding to SIFS.

TB PPDUs 1041 and 1042 may be transmitted at the same time period, and may be transmitted from a plurality of STAs (e.g., user STAs) having AIDs indicated in the trigger frame 1030. An ACK frame 1050 for the TB PPDU may be implemented in various forms.

A specific feature of the trigger frame is described with reference to FIG. 11 to FIG. 13. Even if UL-MU communication is used, an orthogonal frequency division multiple access (OFDMA) scheme or a MU MIMO scheme may be used, and the OFDMA and MU-MIMO schemes may be simultaneously used.

Figure 11:
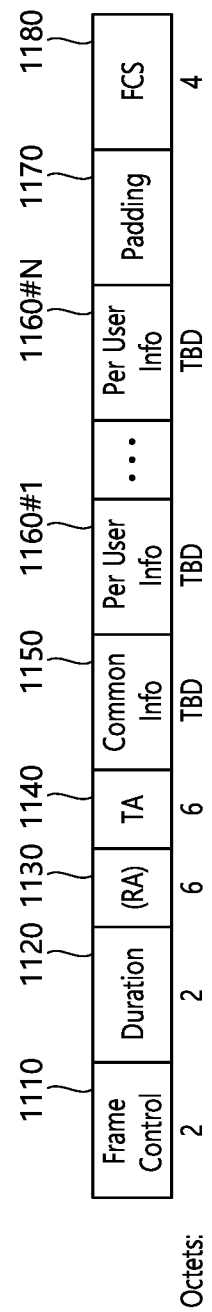
FIG. 11 illustrates an example of a trigger frame.

FIG. 11 illustrates an example of a trigger frame. The trigger frame of FIG. 11 allocates a resource for uplink multiple-user (MU) transmission, and may be transmitted, for example, from an AP. The trigger frame may be configured of a MAC frame, and may be included in a PPDU.

Each field shown in FIG. 11 may be partially omitted, and another field may be added. In addition, a length of each field may be changed to be different from that shown in the figure.

A frame control field 1110 of FIG. 11 may include information related to a MAC protocol version and extra additional control information. A duration field 1120 may include time information for NAV configuration or information related to an identifier (e.g., AID) of a STA.

In addition, an RA field 1130 may include address information of a receiving STA of a corresponding trigger frame, and may be optionally omitted. A TA field 1140 may include address information of a STA (e.g., an AP) which transmits the corresponding trigger frame. A common information field 1150 includes common control information applied to the receiving STA which receives the corresponding trigger frame. For example, a field indicating a length of an L-SIG field of an uplink PPDU transmitted in response to the corresponding trigger frame or information for controlling content of a SIG-A field (i.e., HE-SIG-A field) of the uplink PPDU transmitted in response to the corresponding trigger frame may be included. In addition, as common control information, information related to a length of a CP of the uplink PPDU transmitted in response to the corresponding trigger frame or information related to a length of an LTF field may be included.

In addition, per user information fields 1160#1 to 1160#N corresponding to the number of receiving STAs which receive the trigger frame of FIG. 11 are preferably included. The per user information field may also be called an "allocation field".

In addition, the trigger frame of FIG. 11 may include a padding field 1170 and a frame check sequence field 1180.

Each of the per user information fields 1160#1 to 1160#N shown in FIG. 11 may include a plurality of subfields.

Figure 12:
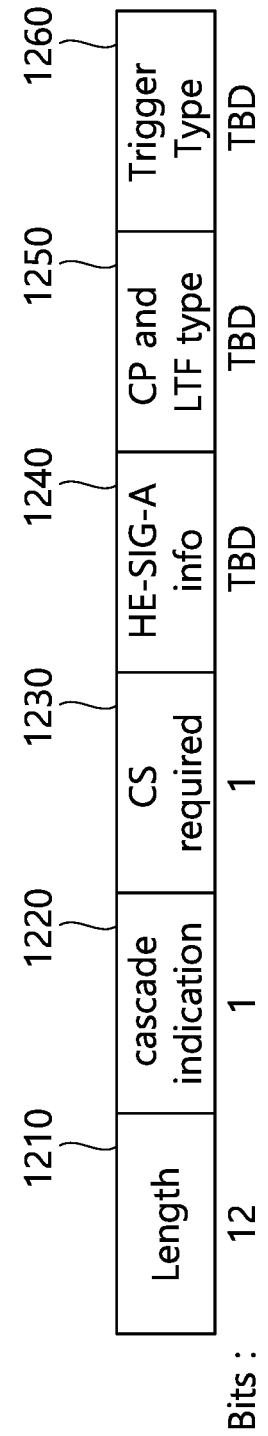
FIG. 12 illustrates an example of a common information field of a trigger frame.

FIG. 12 illustrates an example of a common information field of a trigger frame. A subfield of FIG. 12 may be partially omitted, and an extra subfield may be added. In addition, a length of each subfield illustrated may be changed.

A length field 1210 illustrated has the same value as a length field of an L-SIG field of an uplink PPDU transmitted in response to a corresponding trigger frame, and a length field of the L-SIG field of the uplink PPDU indicates a length of the uplink PPDU. As a result, the length field 1210 of the trigger frame may be used to indicate the length of the corresponding uplink PPDU.

In addition, a cascade identifier field 1220 indicates whether a cascade operation is performed. The cascade operation implies that downlink MU transmission and uplink MU transmission are performed together in the same TXOP. That is, it implies that downlink MU transmission is performed and thereafter uplink MU transmission is performed after a pre-set time (e.g., SIFS). During the cascade operation, only one transmitting device (e.g., AP) may perform downlink communication, and a plurality of transmitting devices (e.g., non-APs) may perform uplink communication.

A CS request field 1230 indicates whether a wireless medium state or a NAV or the like is necessarily considered in a situation where a receiving device which has received a corresponding trigger frame transmits a corresponding uplink PPDU.

An HE-SIG-A information field 1240 may include information for controlling content of a SIG-A field (i.e., HE-SIG-A field) of the uplink PPDU in response to the corresponding trigger frame.

A CP and LTF type field 1250 may include information related to a CP length and LTF length of the uplink PPDU transmitted in response to the corresponding trigger frame. A trigger type field 1260 may indicate a purpose of using the corresponding trigger frame, for example, typical triggering, triggering for beamforming, a request for block ACK/NACK, or the like.

It may be assumed that the trigger type field 1260 of the trigger frame in the present specification indicates a trigger frame of a basic type for typical triggering. For example, the trigger frame of the basic type may be referred to as a basic trigger frame.

Figure 13:
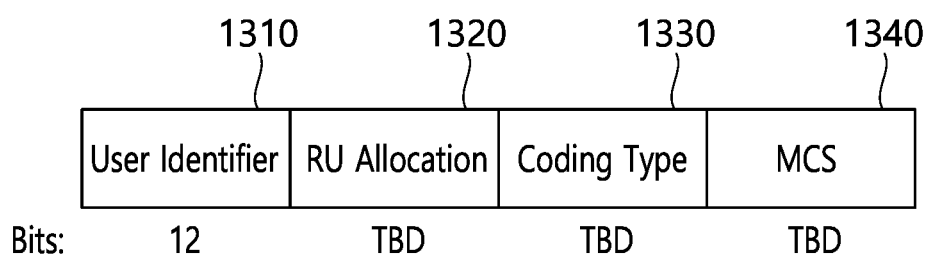
FIG. 13 illustrates an example of a subfield included in a per user information field.

FIG. 13 illustrates an example of a subfield included in a per user information field. A user information field 1300 of FIG. 13 may be understood as any one of the per user information fields 1160#1 to 1160#N mentioned above with reference to FIG. 11. A subfield included in the user information field 1300 of FIG. 13 may be partially omitted, and an extra subfield may be added. In addition, a length of each subfield illustrated may be changed.

A user identifier field 1310 of FIG. 13 indicates an identifier of a STA (i.e., receiving STA) corresponding to per user information. An example of the identifier may be the entirety or part of an association identifier (AID) value of the receiving STA.

In addition, an RU allocation field 1320 may be included. That is, when the receiving STA identified through the user identifier field 1310 transmits a TB PPDU in response to the trigger frame, the TB PPDU is transmitted through an RU indicated by the RU allocation field 1320. In this case, the RU indicated by the RU allocation field 1320 may be an RU shown in FIG. 5, FIG. 6, and FIG. 7.

The subfield of FIG. 13 may include a coding type field 1330. The coding type field 1330 may indicate a coding type of the TB PPDU. For example, when BCC coding is applied to the TB PPDU, the coding type field 1330 may be set to '1', and when LDPC coding is applied, the coding type field 1330 may be set to '0'.

In addition, the subfield of FIG. 13 may include an MCS field 1340. The MCS field 1340 may indicate an MCS scheme applied to the TB PPDU. For example, when BCC coding is applied to the TB PPDU, the coding type field 1330 may be set to '1', and when LDPC coding is applied, the coding type field 1330 may be set to '0'.

Hereinafter, a UL OFDMA-based random access (UORA) scheme will be described.

Figure 14:
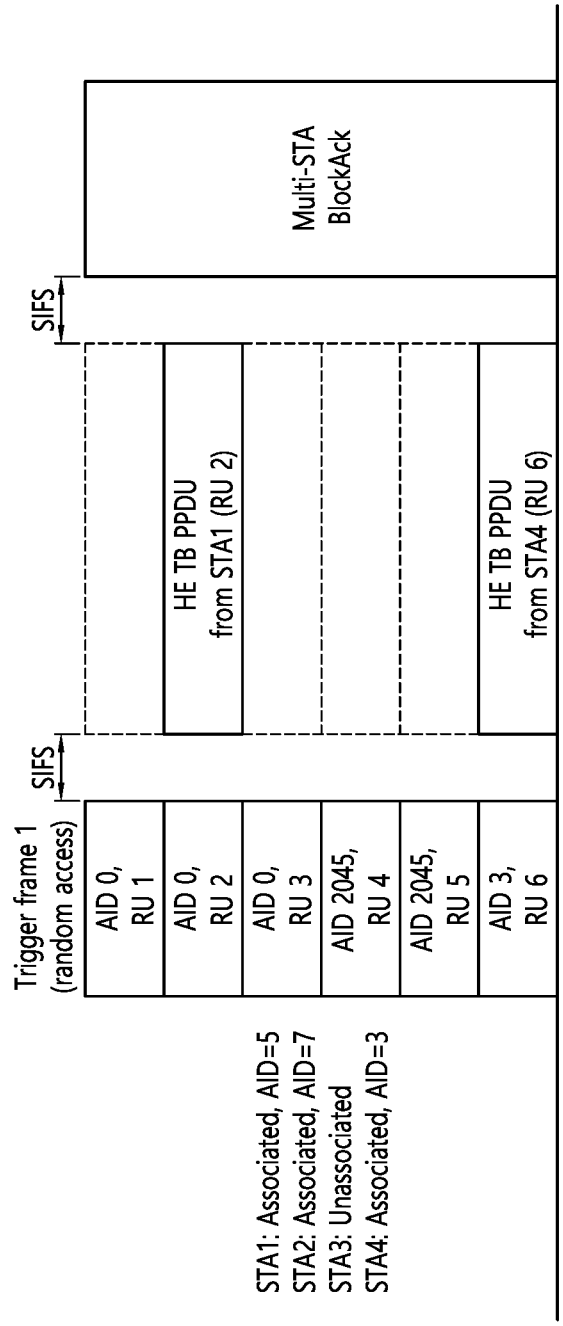
FIG. 14 describes a technical feature of the UORA scheme.

FIG. 14 describes a technical feature of the UORA scheme.

A transmitting STA (e.g., an AP) may allocate six RU resources through a trigger frame as shown in FIG. 14. Specifically, the AP may allocate a 1st RU resource (AID 0, RU 1), a 2nd RU resource (AID 0, RU 2), a 3rd RU resource (AID 0, RU 3), a 4th RU resource (AID 2045, RU 4), a 5th RU resource (AID 2045, RU 5), and a 6th RU resource (AID 3, RU 6). Information related to the AID 0, AID 3, or AID 2045 may be included, for example, in the user identifier field 1310 of FIG. 13. Information related to the RU 1 to RU 6 may be included, for example, in the RU allocation field 1320 of FIG. 13. AID=0 may imply a UORA resource for an associated STA, and AID=2045 may imply a UORA resource for an un-associated STA. Accordingly, the 1st to 3rd RU resources of FIG. 14 may be used as a UORA resource for the associated STA, the 4th and 5th RU resources of FIG. 14 may be used as a UORA resource for the un-associated STA, and the 6th RU resource of FIG. 14 may be used as a typical resource for UL MU.

In the example of FIG. 14, an OFDMA random access backoff (OBO) of a STA1 is decreased to 0, and the STA1 randomly selects the 2nd RU resource (AID 0, RU 2). In addition, since an OBO counter of a STA2/3 is greater than 0, an uplink resource is not allocated to the STA2/3. In addition, regarding a STA4 in FIG. 14, since an AID (e.g., AID=3) of the STA4 is included in a trigger frame, a resource of the RU 6 is allocated without backoff.

Specifically, since the STA1 of FIG. 14 is an associated STA, the total number of eligible RA RUs for the STA1 is 3 (RU 1, RU 2, and RU 3), and thus the STA1 decreases an OBO counter by 3 so that the OBO counter becomes 0. In addition, since the STA2 of FIG. 14 is an associated STA, the total number of eligible RA RUs for the STA2 is 3 (RU 1, RU 2, and RU 3), and thus the STA2 decreases the OBO counter by 3 but the OBO counter is greater than 0. In addition, since the STA3 of FIG. 14 is an un-associated STA, the total number of eligible RA RUs for the STA3 is 2 (RU 4, RU 5), and thus the STA3 decreases the OBO counter by 2 but the OBO counter is greater than 0.

Figure 15:
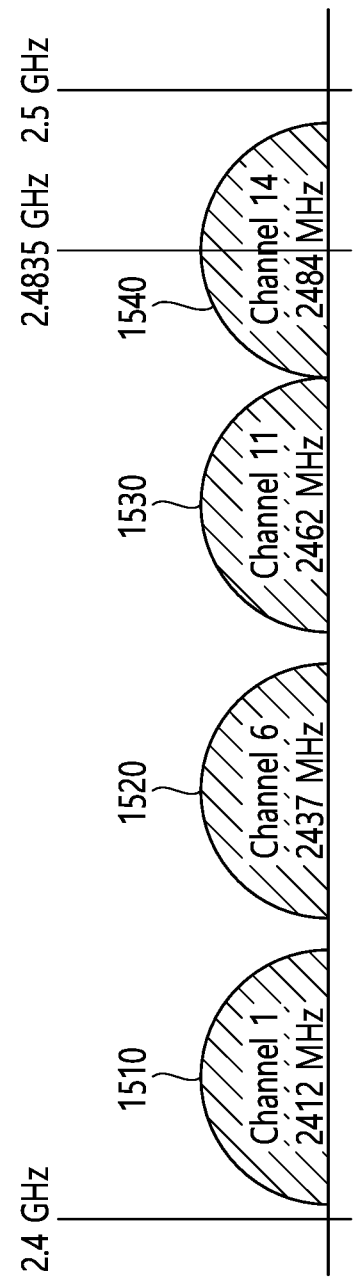
FIG. 15 illustrates an example of a channel used/supported/defined within a 2.4 GHz band.

FIG. 15 illustrates an example of a channel used/supported/defined within a 2.4 GHz band.

The 2.4 GHz band may be called in other terms such as a first band. In addition, the 2.4 GHz band may imply a frequency domain in which channels of which a center frequency is close to 2.4 GHz (e.g., channels of which a center frequency is located within 2.4 to 2.5 GHz) are used/supported/defined.

A plurality of 20 MHz channels may be included in the 2.4 GHz band. 20 MHz within the 2.4 GHz may have a plurality of channel indices (e.g., an index 1 to an index 14). For example, a center frequency of a 20 MHz channel to which a channel index 1 is allocated may be 2.412 GHz, a center frequency of a 20 MHz channel to which a channel index 2 is allocated may be 2.417 GHz, and a center frequency of a 20 MHz channel to which a channel index N is allocated may be (2.407+0.005*N) GHz. The channel index may be called in various terms such as a channel number or the like. Specific numerical values of the channel index and center frequency may be changed.

FIG. 15 exemplifies 4 channels within a 2.4 GHz band. Each of 1st to 4th frequency domains 1510 to 1540 shown herein may include one channel. For example, the 1st frequency domain 1510 may include a channel 1 (a 20 MHz channel having an index 1). In this case, a center frequency of the channel 1 may be set to 2412 MHz. The 2nd frequency domain 1520 may include a channel 6. In this case, a center frequency of the channel 6 may be set to 2437 MHz. The 3rd frequency domain 1530 may include a channel 11. In this case, a center frequency of the channel 11 may be set to 2462 MHz. The 4th frequency domain 1540 may include a channel 14. In this case, a center frequency of the channel 14 may be set to 2484 MHz.

Figure 16:
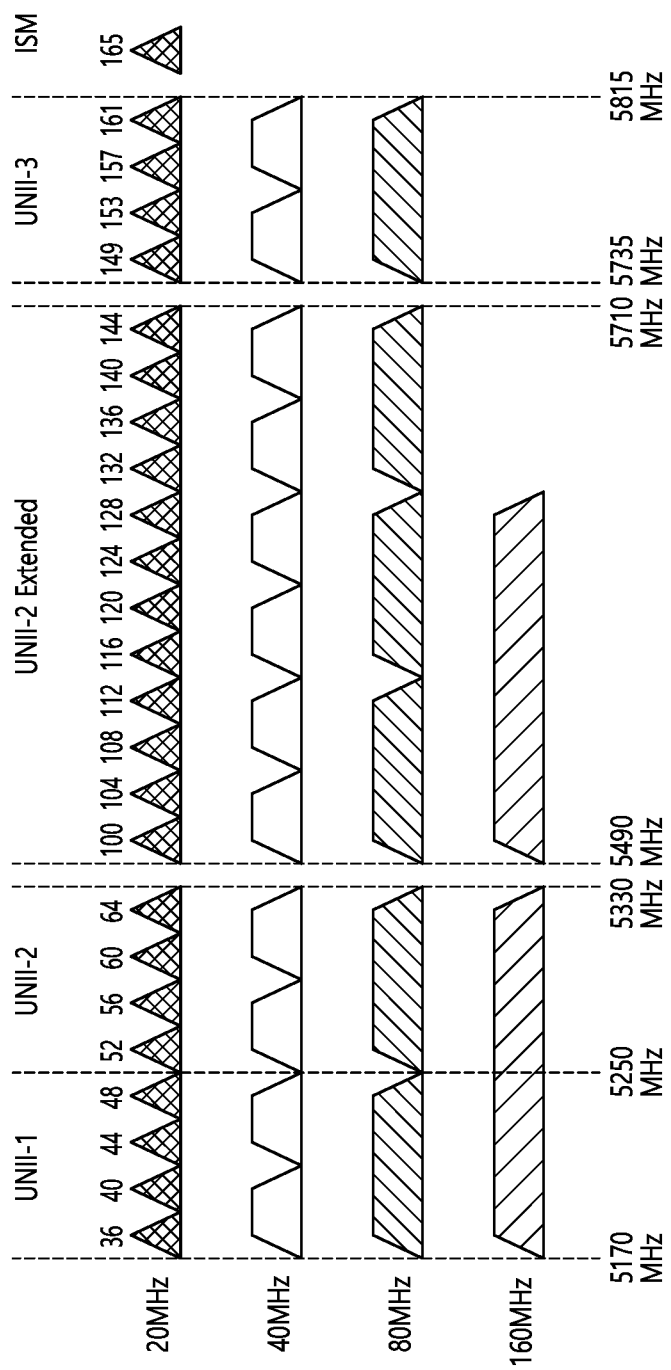
FIG. 16 illustrates an example of a channel used/supported/defined within a 5 GHz band.

FIG. 16 illustrates an example of a channel used/supported/defined within a 5 GHz band.

The 5 GHz band may be called in other terms such as a second band or the like. The 5 GHz band may imply a frequency domain in which channels of which a center frequency is greater than or equal to 5 GHz and less than 6 GHz (or less than 5.9 GHz) are used/supported/defined. Alternatively, the 5 GHz band may include a plurality of channels between 4.5 GHz and 5.5 GHz. A specific numerical value shown in FIG. 16 may be changed.

A plurality of channels within the 5 GHz band include an unlicensed national information infrastructure (UNII)-1, a UNII-2, a UNII-3, and an ISM. The INII-1 may be called UNII Low. The UNII-2 may include a frequency domain called UNII Mid and UNII-2Extended. The UNII-3 may be called UNII-Upper.

A plurality of channels may be configured within the 5 GHz band, and a bandwidth of each channel may be variously set to, for example, 20 MHz, 40 MHz, 80 MHz, 160 MHz, or the like. For example, 5170 MHz to 5330 MHz frequency domains/ranges within the UNII-1 and UNII-2 may be divided into eight 20 MHz channels. The 5170 MHz to 5330 MHz frequency domains/ranges may be divided into four channels through a 40 MHz frequency domain. The 5170 MHz to 5330 MHz frequency domains/ranges may be divided into two channels through an 80 MHz frequency domain. Alternatively, the 5170 MHz to 5330 MHz frequency domains/ranges may be divided into one channel through a 160 MHz frequency domain.

Figure 17:
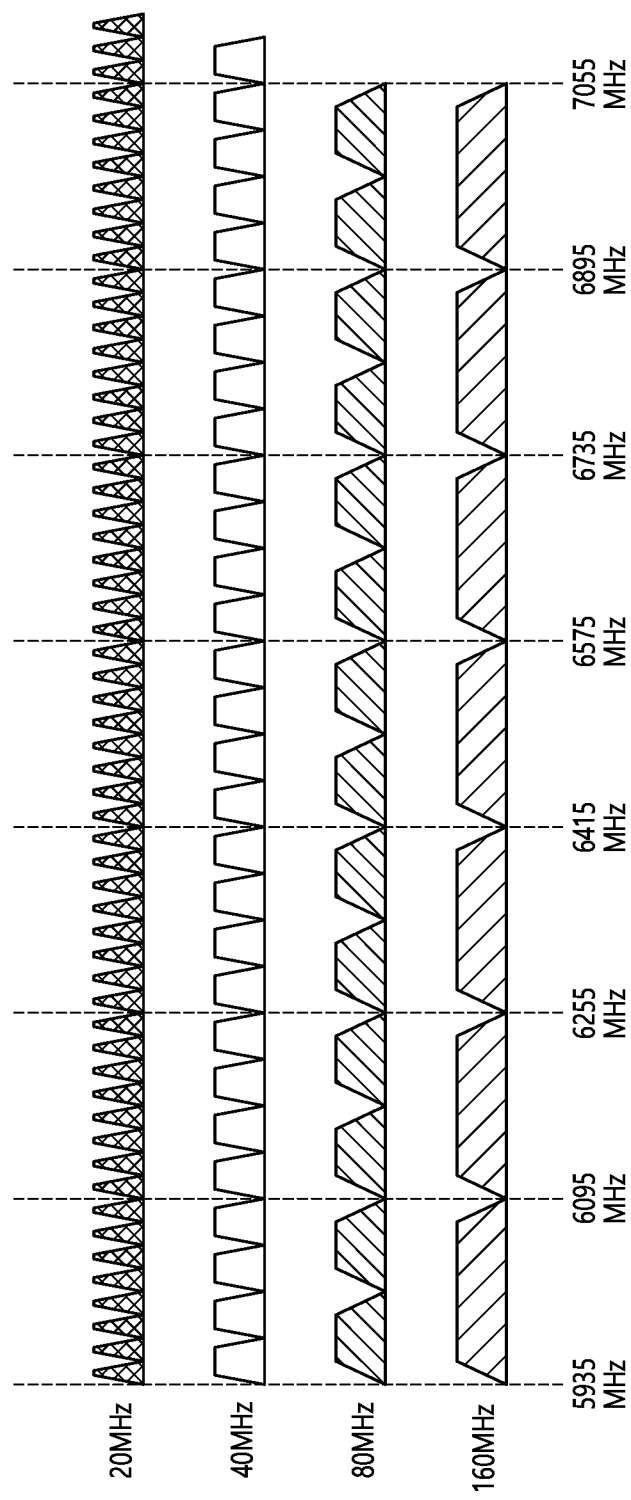
FIG. 17 illustrates an example of a channel used/supported/defined within a 6 GHz band.

FIG. 17 illustrates an example of a channel used/supported/defined within a 6 GHz band.

The 6 GHz band may be called in other terms such as a third band or the like. The 6 GHz band may imply a frequency domain in which channels of which a center frequency is greater than or equal to 5.9 GHz are used/supported/defined. A specific numerical value shown in FIG. 17 may be changed.

For example, the 20 MHz channel of FIG. 17 may be defined starting from 5.940 GHz. Specifically, among 20 MHz channels of FIG. 17, the leftmost channel may have an index 1 (or a channel index, a channel number, etc.), and 5.945 GHz may be assigned as a center frequency. That is, a center frequency of a channel of an index N may be determined as (5.940+0.005*N) GHz.

Accordingly, an index (or channel number) of the 2 MHz channel of FIG. 17 may be 1, 5, 9, 13, 17, 21, 25, 29, 33, 37, 41, 45, 49, 53, 57, 61, 65, 69, 73, 77, 81, 85, 89, 93, 97, 101, 105, 109, 113, 117, 121, 125, 129, 133, 137, 141, 145, 149, 153, 157, 161, 165, 169, 173, 177, 181, 185, 189, 193, 197, 201, 205, 209, 213, 217, 221, 225, 229, 233. In addition, according to the aforementioned (5.940+0.005*N)GHz rule, an index of the 40 MHz channel of FIG. 17 may be 3, 11, 19, 27, 35, 43, 51, 59, 67, 75, 83, 91, 99, 107, 115, 123, 131, 139, 147, 155, 163, 171, 179, 187, 195, 203, 211, 219, 227.

Although 20, 40, 80, and 160 MHz channels are illustrated in the example of FIG. 17, a 240 MHz channel or a 320 MHz channel may be additionally added.

Hereinafter, a PPDU transmitted/received in a STA of the present specification will be described.

FIG. 18 illustrates an example of a PPDU used in the present specification.

The PPDU depicted in FIG. 18 may be referred to as various terms such as an EHT PPDU, a TX PPDU, an RX PPDU, a first type or N-th type PPDU, or the like. In addition, the EHT PPDU may be used in an EHT system and/or a new WLAN system enhanced from the EHT system.

The subfields depicted in FIG. 18 may be referred to as various terms. For example, a SIG A field may be referred to an EHT-SIG-A field, a SIG B field may be referred to an EHT-SIG-B, a STF field may be referred to an EHT-STF field, and an LTF field may be referred to an EHT-LTF.

The subcarrier spacing of the L-LTF, L-STF, L-SIG, and RL-SIG fields of FIG. 18 can be set to 312.5 kHz, and the subcarrier spacing of the STF, LTF, and Data fields of FIG. 18 can be set to 78.125 kHz. That is, the subcarrier index of the L-LTF, L-STF, L-SIG, and RL-SIG fields can be expressed in unit of 312.5 kHz, and the subcarrier index of the STF, LTF, and Data fields can be expressed in unit of 78.125 kHz.

The SIG A and/or SIG B fields of FIG. 18 may include additional fields (e.g., a SIG C field or one control symbol, etc.). The subcarrier spacing of all or part of the SIG A and SIG B fields may be set to 312.5 kHz, and the subcarrier spacing of all or part of newly-defined SIG field(s) may be set to 312.5 kHz. Meanwhile, the subcarrier spacing for a part of the newly-defined SIG field(s) may be set to a pre-defined value (e.g., 312.5 kHz or 78.125 kHz).

In the PPDU of FIG. 18, the L-LTF and the L-STF may be the same as conventional L-LTF and L-STF fields.

The L-SIG field of FIG. 18 may include, for example, bit information of 24 bits. For example, the 24-bit information may include a rate field of 4 bits, a reserved bit of 1 bit, a length field of 12 bits, a parity bit of 1 bit, and a tail bit of 6 bits. For example, the length field of 12 bits may include information related to the number of octets of a corresponding Physical Service Data Unit (PSDU). For example, the length field of 12 bits may be determined based on a type of the PPDU. For example, when the PPDU is a non-HT, HT, VHT PPDU or an EHT PPDU, a value of the length field may be determined as a multiple of 3. For example, when the PPDU is an HE PPDU, the value of the length field may be determined as 'a multiple of 3+1' or 'a multiple of 3+2'. In other words, for the non-HT, HT, VHT PPDI or the EHT PPDU, the value of the length field may be determined as 'a multiple of 3', and for the HE PPDU, the value of the length field may be determined as 'a multiple of 3+1' or 'a multiple of 3+2'.

For example, the transmitting STA may apply BCC encoding based on a 1/2 coding rate to the 24-bit information of the L-SIG field. Thereafter, the transmitting STA may obtain a BCC coding bit of 48 bits. BPSK modulation may be applied to the 48-bit coding bit, thereby generating 48 BPSK symbols. The transmitting STA may map the 48 BPSK symbols to positions except for a pilot subcarrier {subcarrier index −21, −7, +7, +21} and a DC subcarrier {subcarrier index 0}. As a result, the 48 BPSK symbols may be mapped to subcarrier indices −26 to −22, −20 to −8, −6 to −1, +1 to +6, +8 to +20, and +22 to +26. The transmitting STA may additionally map a signal of {−1, −1, −1, 1} to a subcarrier index {−28, −27, +27, +28}. The aforementioned signal may be used for channel estimation on a frequency domain corresponding to {−28, −27, +27, +28}.

The transmitting STA may generate an RL-SIG which is identical to the L-SIG. BPSK modulation may be applied to the RL-SIG. The receiving STA may figure out that the RX PPDU is the HE PPDU or the EHT PPDU, based on the presence of the RL-SIG.

After the RL-SIG of FIG. 18, for example, EHT-SIG-A or one control symbol may be inserted. A symbol contiguous to the RL-SIG (i.e., EHT-SIG-A or one control symbol) may include 26-bit information and may further include information for identifying the type of the EHT PPDU. For example, when the EHT PPDU is classified into various types (e.g., an EHT PPDU supporting an SU mode, an EHT PPDU supporting a MU mode, an EHT PPDU related to the Trigger Frame, an EHT PPDU related to an Extended Range transmission, etc.), Information related to the type of the EHT PPDU may be included in a symbol contiguous to the RL-SIG.

A symbol contiguous to the RL-SIG may include, for example, information related to the length of the TXOP and information related to the BSS color ID. For example, the SIG-A field may be contiguous to the symbol contiguous to the RL-SIG (e.g., one control symbol). Alternatively, a symbol contiguous to the RL-SIG may be the SIG-A field.

For example, the SIG-A field may include 1) a DL/UL indicator, 2) a BSS color field which is an identifier of a BSS, 3) a field including information related to the remaining time of a current TXOP duration, 4) a bandwidth field including information related to the bandwidth, 5) a field including information related to an MCS scheme applied to an HE-SIG B, 6) a field including information related to whether a dual subcarrier modulation (DCM) scheme is applied to the HE-SIG B, 7) a field including information related to the number of symbols used for the HE-SIG B, 8) a field including information related to whether the HE-SIG B is generated over the entire band, 9) a field including information related to the type of the LTF/STF, 10) a field indicating the length of the HE-LTF and a CP length.

The SIG-B of FIG. 18 may include the technical features of HE-SIG-B shown in the example of FIGS. 8 to 9 as it is.

An STF of FIG. 18 may be used to improve automatic gain control estimation in a multiple input multiple output (MIMO) environment or an OFDMA environment. An LTF of FIG. 18 may be used to estimate a channel in the MIMO environment or the OFDMA environment.

The EHT-STF of FIG. 18 may be set in various types. For example, a first type of STF (e.g., 1×STF) may be generated based on a first type STF sequence in which a non-zero coefficient is arranged with an interval of 16 subcarriers. An STF signal generated based on the first type STF sequence may have a period of 0.8 μs, and a periodicity signal of 0.8 μs may be repeated 5 times to become a first type STF having a length of 4 μs. For example, a second type of STF (e.g., 2×STF) may be generated based on a second type STF sequence in which a non-zero coefficient is arranged with an interval of 8 subcarriers. An STF signal generated based on the second type STF sequence may have a period of 1.6 μs, and a periodicity signal of 1.6 μs may be repeated 5 times to become a second type STF having a length of 8 μs. For example, a third type of STF (e.g., 4×STF) may be generated based on a third type STF sequence in which a non-zero coefficient is arranged with an interval of 4 subcarriers. An STF signal generated based on the third type STF sequence may have a period of 3.2 μs, and a periodicity signal of 3.2 μs may be repeated 5 times to become a second type STF having a length of 16 μs. Only some of the first to third type EHT-STF sequences may be used. In addition, the EHT-LTF field may also have first, second, and third types (i.e., 1×, 2×, 4×LTF). For example, the first/second/third type LTF field may be generated based on an LTF sequence in which a non-zero coefficient is arranged with an interval of 4/2/1 subcarriers. The first/second/third type LTF may have a time length of 3.2/6.4/12.8 μs. In addition, Guard Intervals (GIs) with various lengths (e.g., 0.8/1/6/3.2 μs) may be applied to the first/second/third type LTF.

Information related to the type of STF and/or LTF (including information related to GI applied to the LTF) may be included in the SIG A field and/or the SIG B field of FIG. 18.

The PPDU of FIG. 18 may support various bandwidths. For example, the PPDU of FIG. 18 may have a bandwidth of 20/40/80/160/240/320 MHz. For example, at least one field (e.g., STF, LTF, data) of FIG. 18 may be configured based on RUs illustrated in FIGS. 5 to 7, and the like. For example, when there is one receiving STA of the PPDU of FIG. 18, all fields of the PPDU of FIG. 18 may occupy the entire bandwidth. For example, when there are multiple receiving STAs of the PPDU of FIG. 18 (i.e., when MU PPDU is used), some fields (e.g., STF, LTF, data) of FIG. 18 may be configured based on the RUs shown in FIGS. 5 to 7. For example, the STF, LTF, and data fields for the first receiving STA of the PPDU may be transmitted/received through a first RU, and the STF, LTF, and data fields for the second receiving STA of the PPDU may be transmitted/received through a second RU. In this case, the locations/positions of the first and second RUs may be determined based on FIGS. 5 to 7, and the like.

The PPDU of FIG. 18 may be determined (or identified) as an EHT PPDU based on the following method.

A receiving STA may determine a type of an RX PPDU as the EHT PPDU, based on the following aspect. For example, the RX PPDU may be determined as the EHT PPDU: 1) when a first symbol after an L-LTF signal of the RX PPDU is a BPSK symbol; 2) when RL-SIG in which the L-SIG of the RX PPDU is repeated is detected; and 3) when a result of applying "module 3" to a value of a length field of the L-SIG of the RX PPDU is detected as "0". When the RX PPDU is determined as the EHT PPDU, the receiving STA may detect a type of the EHT PPDU (e.g., an SU/MU/Trigger-based/Extended Range type), based on bit information included in a symbol after the RL-SIG of FIG. 18. In other words, the receiving STA may determine the RX PPDU as the EHT PPDU, based on: 1) a first symbol after an L-LTF signal, which is a BPSK symbol; 2) RL-SIG contiguous to the L-SIG field and identical to L-SIG; and 3) L-SIG including a length field in which a result of applying "modulo 3" is set to "0."

For example, the receiving STA may determine the type of the RX PPDU as the EHT PPDU, based on the following aspect. For example, the RX PPDU may be determined as the HE PPDU: 1) when a first symbol after an L-LTF signal is a BPSK symbol; 2) when RL-SIG in which the L-SIG is repeated is detected; and 3) when a result of applying "module 3" to a value of a length field of the L-SIG is detected as "1" or "2".

For example, the receiving STA may determine the type of the RX PPDU as a non-HT, HT, and VHT PPDU, based on the following aspect. For example, the RX PPDU may be determined as the non-HT, HT, and VHT PPDU: 1) when a first symbol after an L-LTF signal is a BPSK symbol; and 2) when RL-SIG in which L-SIG is repeated is not detected. In addition, even if the receiving STA detects that the RL-SIG is repeated, when a result of applying "modulo 3" to the length value of the L-SIG is detected as "0", the RX PPDU may be determined as the non-HT, HT, and VHT PPDU.

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/received based on the PPDU of FIG. 18. The PPDU of FIG. 18 may be used to transmit/receive frames of various types. For example, the PPDU of FIG. 18 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 18 may be used for a management frame. An example of the management frame may include a beacon frame, a (re-)association request frame, a (re-)association response frame, a probe request frame, and a probe response frame. For example, the PPDU of FIG. 18 may be used for a data frame. For example, the PPDU of FIG. 18 may be used to simultaneously transmit at least two or more of the control frame, the management frame, and the data frame.

Figure 19:
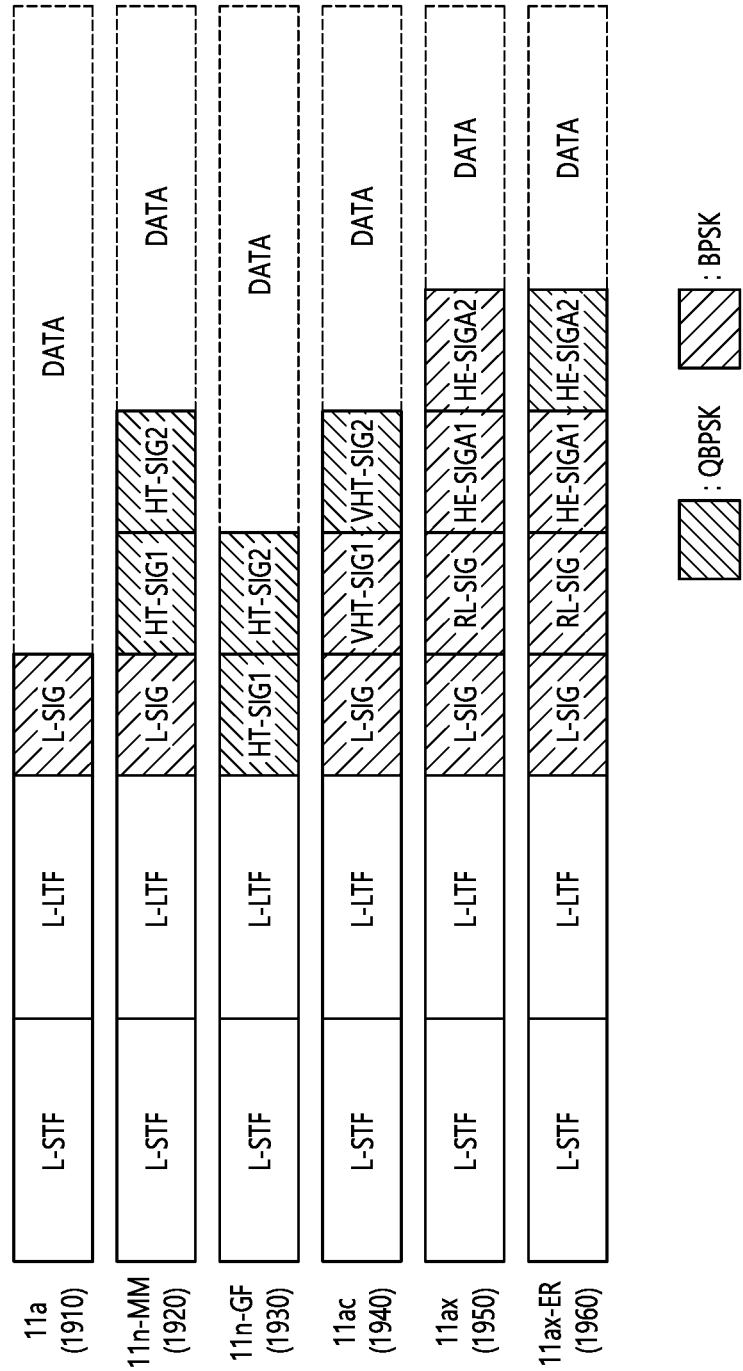
FIG. 19 shows an example of various types of PPDUs.

FIG. 19 shows an example of various types of PPDUs.

As shown in FIG. 19, examples of the type (i.e., format) of the PPDU used in the WLAN system include non-HT, HT, VHT, HE PPDUs, and the like. Specifically, the illustrated first type PPDU 1910 is a non-HT PPDU defined in the IEEE 802.11a standard, etc., and the illustrated second type PPDU 1920 and the third type PPDU 1930 are an HT PPDU defined in the IEEE 802.11n standard, etc. In addition, the illustrated fourth type PPDU 1940 is a VHT PPDU defined in the IEEE 802.11ac standard, etc., and the illustrated fifth type PPDU 1950 and the sixth type PPDU 1960 are HE PPDUs defined in the IEEE 802.11ax standard, etc.

All types of PPDUs 1910, 1920, 1930, 1940, 1950, and 1960 shown in FIG. 19 include L-STF and L-LTF fields. Each of the L-STF and L-LTF fields may be transmitted on two symbols (e.g., OFDM symbols). That is, each of the L-STF and L-LTF fields may have a transmission time of 8 us.

All types of PPDUs 1910, 1920, 1930, 1940, 1950, and 1960 shown in FIG. 19 include an L-SIG field or an HT-SIG1 field being contiguous to the L-LTF field. The L-SIG field or the HT-SIG1 field shown in FIG. 19 may be transmitted through one symbol.

As shown in FIG. 19, the HT-SIG1 field of the third type PPDU 1930 may be modulated based on a quadrature binary phase shift keying (QBPSK) constellation. The QBPSK constellation may be a constellation rotated by 90 degrees counterclockwise based on the BPSK constellation.

Figure 20:
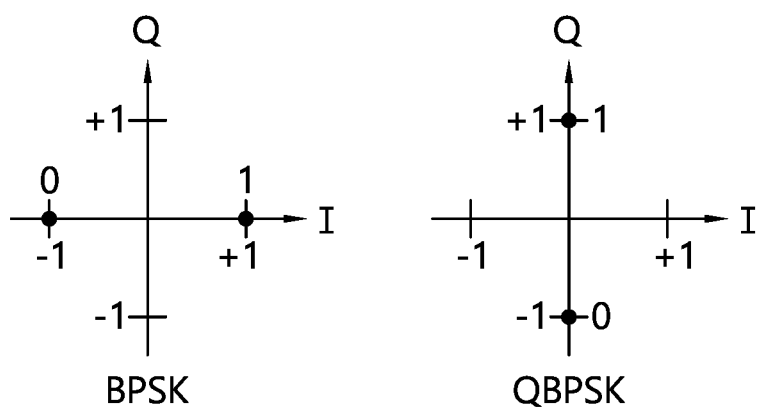
FIG. 20 is a diagram for distinguishing between BPSK and QBPSK.

FIG. 20 is a diagram for distinguishing between BPSK and QBPSK. As shown, the QBPSK constellation (mapping) may be a constellation rotated by 90 degrees counterclockwise based on the BPSK constellation (mapping).

Since the QBPSK is applied to the HT-SIG1 field of the third type PPDU 1930 of FIG. 19, the receiving STA can identify that the received PPDU is a third type PPDU when the QBPSK is applied to symbols received after the L-LTF field. In addition, when the BPSK is applied to symbols received after the L-LTF field, the receiving STA may identify that the received PPDU is any one of the first, second, fourth, fifth, and sixth types of PPDUs.

The fifth and sixth types of PPDUs may be identified/detected by the receiving STA based on the following example. The fifth and sixth types of PPDUs are repeated L-SIGs (RL-SIGs) in which the fields contiguous to the L-SIG field are repeated as they are. In addition, in the PPDU of the fifth and sixth types, three SIG fields are positioned after the L-SIG field. The receiving STA may identify/detect that the received PPDU is the 5th and 6th type PPDU when the L-SIG is repeated as it is in the symbol contiguous to the L-SIG field and when there are 3 SIG fields after the L-SIG field.

In the meantime, in the fifth type PPDU 1950, the constellation applied to the third SIG field after the L-SIG field is the BPSK. Further, in the sixth type PPDU 1960, the constellation applied to the third SIG field after the L-SIG field is the QBPSK. Accordingly, the receiving STA may distinguish the fifth and sixth types of PPDUs from each other based on whether the constellation applied to the third SIG field after the L-SIG field is the BPSK or the QPBSK.

In addition, in the PPDU of the fourth type, the L-SIG is not repeated in the field contiguous to the L-SIG field, the BPSK is applied to a first symbol contiguous to the L-SIG, and the QBPSK is applied to a second symbol contiguous to the first symbol. Accordingly, the receiving STA may identify the fourth type of PPDU based on whether the QBPSK is applied to the second symbol (and/or whether the L-SIG field is repeated).

In addition, since the QBPSK is applied to two symbols contiguous to the L-SIG for the second type of PPDU, the receiving STA can identify/detect the second type of PPDU from other types of PPDUs. In addition, as described above, since the second to sixth types of PPDUs have distinguishable characteristics, the receiving STA may identify/detect a PPDU that is not identified/detected as the second to sixth types of PPDUs as the first type PPDU.

The specific order of the above-described identification/detection method may be changed. That is, when the number/constellation of symbols after the L-LTF is uniquely configured as shown in FIG. 19, the receiving STA can accurately identify the type of the received PPDU through various methods.

Figure 21:
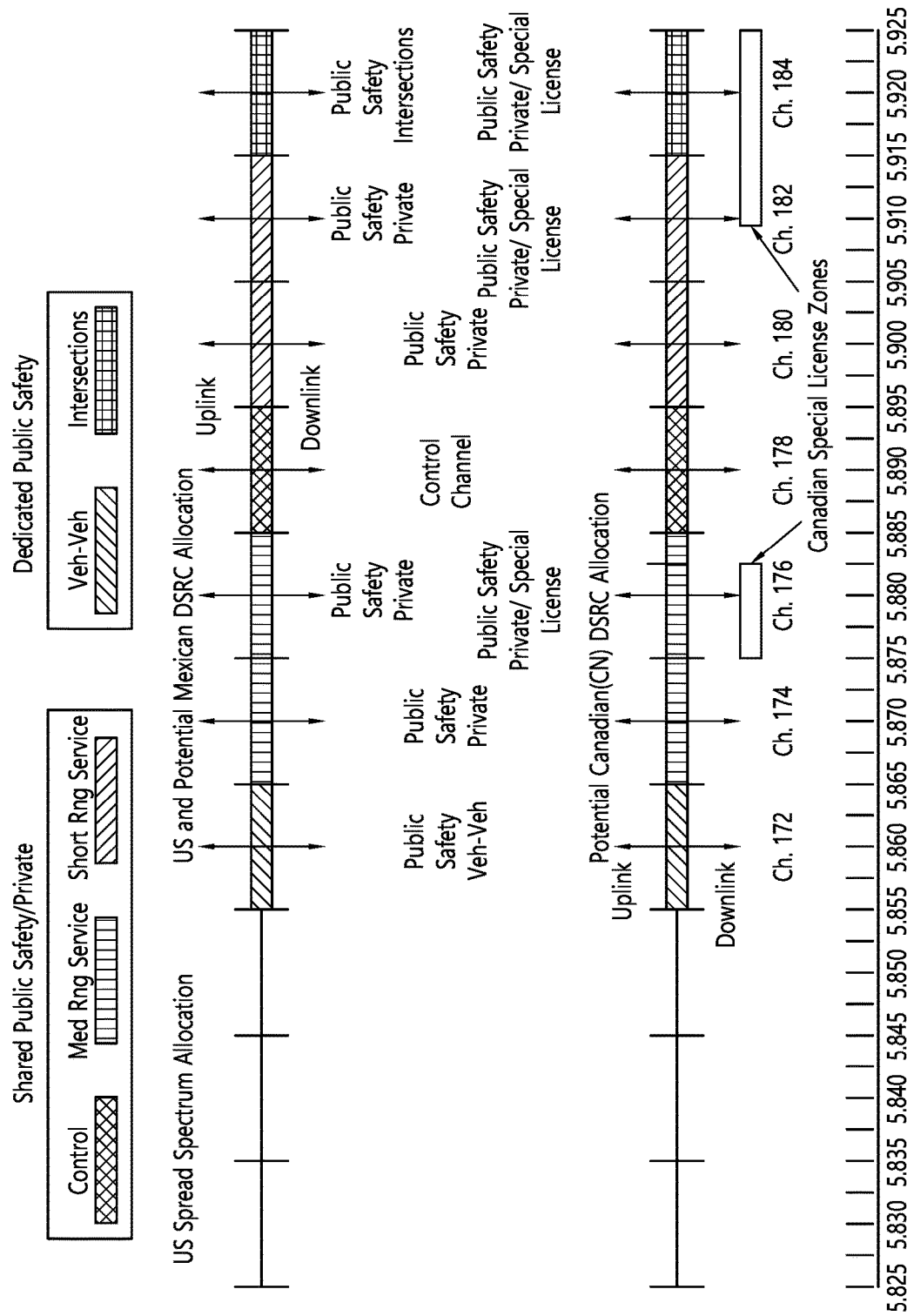
FIG. 21 shows a band plan of 5.9 GHz DSRC.

FIG. 21 shows a band plan of 5.9 GHz DSRC.

The 5.9 GHz DSRC is a short-to-medium-range communication service that supports both public safety and private operations in roadside vehicle and vehicle-to-vehicle communication environments. The DSRC is intended to complement cellular communication by providing very high data rates in situations where it is important to minimize the latency of the communication link and separate relatively small communication areas. Further, the PHY and MAC protocols are based on the IEEE 802.11p amendments for wireless access in the vehicle environment (WAVE).

<IEEE 802.11p>

The 802.11p technology uses 802.11a's PHY with 2× down clocking. That is, the signal is transmitted using 10 MHz bandwidth instead of 20 MHz bandwidth. The numerology comparing 802.11a and 802.11p is as follows.

TABLE 5

| | IEEE 802.11a | IEEE 802.11p |
| --- | --- | --- |
| Symbol duration | 4 us | 8 us |
| Guard period | 0.8 us | 1.6 us |
| Subcarrier spacing | 312.5 KHz | 156.25 KHZ |
| OFDM subcarrier | 52 | 52 |
| Number of pilot | 4 | 4 |
| Default BW | 20 MHz | 10 MHz |
| Data rate (Mbps) | 6, 9, 12, 18, 24, 36, 48, 54 Mbps | 3, 4.5, 6, 9, 12, 18, 24, 27 Mbps |
| Frequency band | 5 GHz ISM | 5.9 GHz dedicated |

DSRC band channels include a control channel and a service channel, and data transmission of 3,4.5,6,9,12,18, 24.27 Mbps is possible. If there is an optional channel of 20 MHz, transmission of 6,9,12,18,24,36,48.54 Mbps is possible. 6,9.12 Mbps transmission should be supported by all services and channels. For the control channel, the preamble is based on 3 Mbps transmission, but the message itself is based on 6 Mbps transmission. Channels 174 and 176, and channels 180 and 182 become channels 175 and 181 of 20 MHz, respectively, when licensed by the frequency coordinating body. The rest are reserved for future use. Short message, notification data, public safety alert data, etc. are broadcast to all On Board Units (OBUs) through the control channel. The reason for separating the control channel and the service channel is to maximize efficiency and service quality and to reduce interference between services.

Channel 178 is a control channel, and all OBUs automatically search for control channels and receive notifications, data transmission, and warning messages from Road Side Unit (RSU). All data on the control channel must be transmitted within 200 ms and repeat at a predefined period. In the control channel, public safety alerts take precedence over all private messages. Private messages longer than a 200 ms duration are sent over the service channel.

A private message or a long public safety message is transmitted through the service channel. To avoid collisions, Carrier Sense Multiple Access (CSMA) which is a method of detecting the channel state before transmission may be used.

Figure 22:
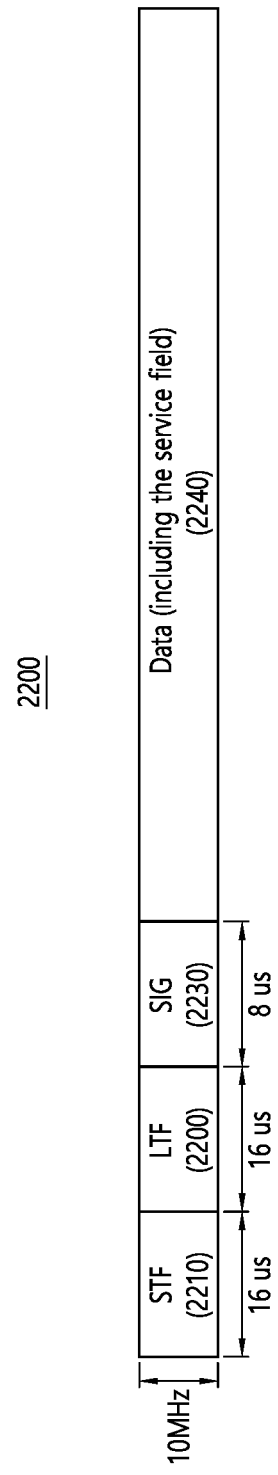
FIG. 22 shows a frame format of a frame according to the 802.11p standard.

FIG. 22 shows a frame format of a frame according to the 802.11p standard.

Referring to FIG. 22, a frame (or packet) according to the 802.11p standard (hereinafter, an 11p frame 2200) may support inter-vehicle communication in a 5.9 GHz band. The 11p frame 2200 may include an STF 2210 for sync and Automatic Gain Control (AGC), an LTF 2200 for channel estimation, and/or a signal field (or SIG field) 2230 including information related to the data field 2240. The data field 2240 may be configured including 16 bits constituting the service field.

The 11p frame 2200 may be configured by applying the same OFDM numerology as the 802.11a standard for a 10 MHz bandwidth. For example, the 802.11p standard can be applied by 2× down clocking OFDM numerology for a 20 MHz bandwidth according to the 802.11a standard. Accordingly, the symbol of the 11p frame 2200 may be set longer than the symbol of the frame according to the 802.11a standard. The symbol of the 11p frame 2200 may have a symbol duration of 8 us. The 11p frame 2200 may have a length twice that of a frame according to the 802.11a standard in terms of time.

Hereinafter, an example of the present specification relates to an NGV PPDU (or NGV frame). The NGV PPDU may be used in various wireless communication systems, for example, in an IEEE 802.11bd wireless LAN system. The NGV PPDU may be called by various names. For example, the NGV PPDU may be called by various names such as a first type PPDU, a transmission PPDU, a reception PPDU, and a wireless LAN PPDU. The NGV PPDU may include a legacy training field, a first legacy control field, a second legacy control field, a Next Generation Vehicular network (NGV) control field, and an NGV data field.

The legacy training field may include various fields. For example, the legacy training field may include L-STF or L-LTF. The legacy training field may be called by various names. For example, the legacy training field may be called a first training field, a transmission training field, a reception training field, a wireless LAN training field, and the like. Also, the first legacy control field, the second legacy control field, the NGV control field, and the NGV data field may be referred to by various names. For another example, the NGV control field may be called various names such as a first control field, a transmission control field, a reception control field, and a wireless LAN control field. In addition, the 5.9 GHz band may be variously expressed as an NGV band, a reception band, a transmission band, and the like.

Figure 23:
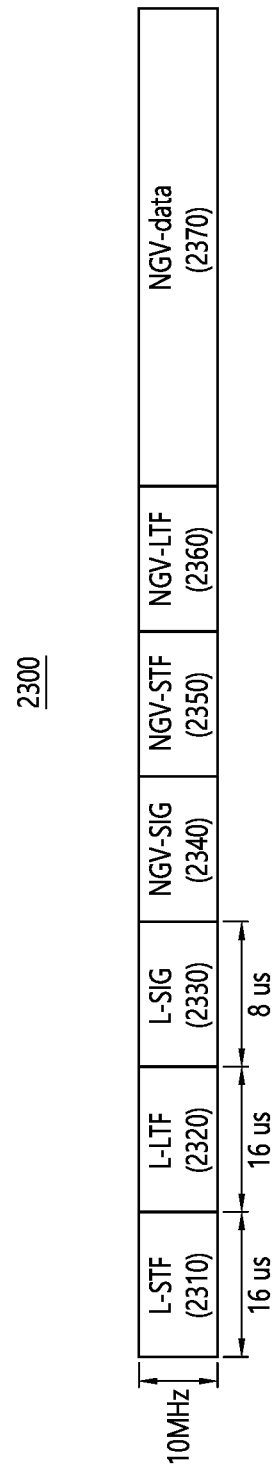
FIG. 23 shows an example of a frame format of an NGV frame.

FIG. 23 shows an example of a frame format of an NGV frame.

Referring to FIG. 23, an NGV frame (or NGV PPDU) 2300 may be proposed for throughput improvement and/or coverage extension in comparison with the 802.11p standard. The NGV frame 2300 may be configured for a 10 MHz bandwidth. For backward compatibility or interoperability with the 802.11p standard, the NGV frame may include a preamble part of the 11p frame.

For backward compatibility or interoperability with the 802.11p standard using the 5.9 GHz band, the L-STF 2310, the L-LTF 2320, and the L-SIG field 2330 constituting the preamble of the 11p frame may be located at the front of the NGV frame 2300. In addition, the NGV frame 2300 may include an NGV-SIG field 2340 including control information for NGV after the L-SIG field 2330, symbols for NGV-STF 2350 and NGV-LTF 2360, and symbols constituting the NGV-data 2370. Although not shown, the NGV frame 2300 may be configured by repeating the L-SIG field. This may be referred to as the RL-SIG field. The RL-SIG field may be configured between the L-SIG field 2330 and the NGV SIG field 2340.

Figure 24:
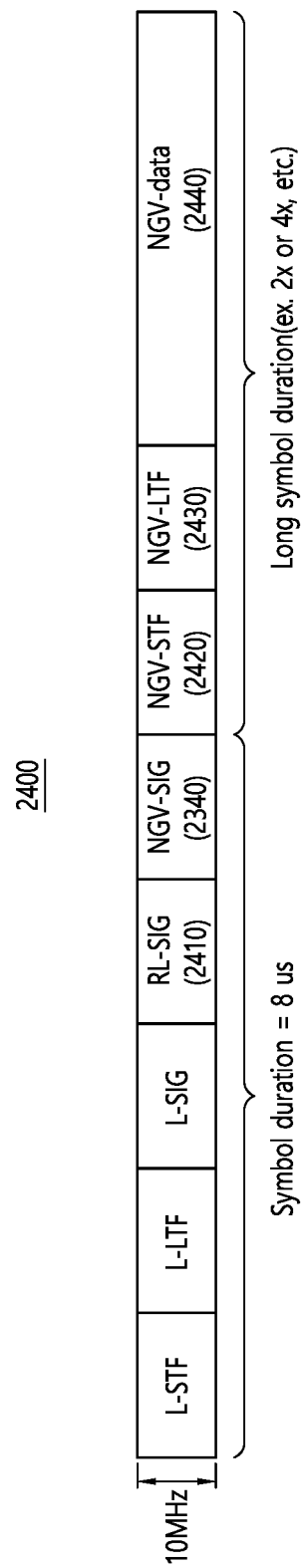
FIG. 24 shows another example of a frame format of an NGV frame.

FIG. 23 is an example of a frame format of an NGV frame, and the NGV frame may be configured in the structure shown in FIG. 24 to distinguish the NGV frame.

FIG. 24 shows another example of a frame format of an NGV frame.

FIG. 24, the NGV frame 2400 may include the RL-SIG field 2410 for NGV frame format indication, or one OFDM symbol for indication information for the NGV frame 2400. The RL-SIG field 2410 for an indication (format indication) for the NGV frame 2400 format, or one OFDM symbol for information indication for the NGV frame may be configured in front of the NGV control field. The number of the RL-SIG field 2410 or the one OFDM symbol may be one or more.

The NGV part may include an NGV-STF 2420, an NGV-LTF 2430, and/or an NGV-data field 2440. The NGV part may be composed of a symbol having the same length as the symbol length of the 11p frame. For example, the NGV part may be composed of symbols according to the same subcarrier spacing (156.25 kHz) as the 11p frame. In addition, the NGV part may consist of a symbol having a length longer than the symbol length of the 11p frame. For example, the NGV part may be composed of a symbol according to a subcarrier spacing (75.125 kHz) different from the 11p frame.

Hereinafter, an embodiment of the present specification proposes a method of performing a packet classification and a type indication for the NGV signal when transmitting and receiving a signal using the NGV frame format as shown in FIG. 24.

Hereinafter, an STA that transmits and receives an NGV signal may be described as an 11bd device. The 11bd device may configure the NGV signal and transmit it to another STA, or may receive and decode the NGV signal. An STA that transmits/receives an NGV signal may be called in various ways as well as an 11bd device. For example, a device transmitting an NGV signal may be referred to as a transmitting STA, an NGV transmitting STA, an NGV STA, or the like. In addition, the device receiving the NGV signal may be referred to as a receiving STA, an NGV receiving STA, an NGV STA, or the like.

First Embodiment—Method of Using Constellation Mapping of OFDM Symbols

1. How to Use Constellation Mapping of One Symbol 1-i). When NGV signal is transmitted, a symbol can be configured by applying Q-BPSK constellation mapping to the symbol being contiguous to the L-SIG. Accordingly, a device to which the 802.11bd standard is applied (hereinafter, an 11bd device) may examine the constellation of the symbol being contiguous to the L-SIG. When the constellation of the symbol contiguous to the L-SIG is Q-BPSK, the 11bd device may determine the received signal as a signal in compliance with the 802.11bd standard. At this time, since the Euclidean distance between BPSK and Q-BPSK is large, false detection can be reduced. In addition, since the 11bd device uses only one symbol, detection can be performed faster than the existing WLAN standard using two symbols. When a signal in compliance with the 802.11p standard (hereinafter, the 11p signal) and a signal in compliance with the 802.11bd standard (hereinafter, the 11bd signal) are transmitted, constellation mapping for the next symbol of the L-SIG may be configured as shown in FIG. 25.

Figure 25:
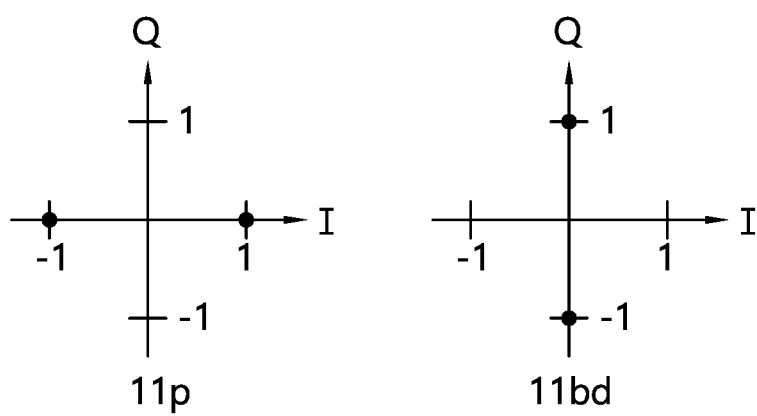
FIG. 25 shows constellation mapping of symbols contiguous to L-SIG in 11p signal and 11bd signal.

FIG. 25 shows constellation mapping of symbols contiguous to L-SIG in 11p signal and 11bd signal.

Referring to FIG. 25, the left diagram of FIG. 25 may represent constellation mapping of symbols contiguous to the L-SIG in the 11p signal. For example, the symbol contiguous to the L-SIG in the 11p signal may be configured as a binary phase shift key (BPSK). The right diagram of FIG. 25 may represent constellation mapping of symbols contiguous to the L-SIG in the 11bd signal. For example, the symbol contiguous to the L-SIG in the 11bd signal may be configured as quadrature BPSK (Q-BPSK).

For example, in the 11bd signal, a symbol configured using the Q-BPSK constellation mapping may be at least one of L-SIG, NGV-SIG, or one OFDM symbol. For example, one OFDM symbol contiguous to the L-SIG may be an RL-SIG in which the L-SIG is repeated.

Since a device using a 5.9 GHz Intelligent Transportation Systems (ITS) band is a device being in compliant with the 802.11p and 802.11bd standards, the two devices can be distinguished using the constellation mapping being applied to the one symbol.

2. Method to Distinguish Using Constellation Mapping for Two Symbols 2-i). The 11bd device (i.e., the NGV device) may review the constellation mapping for the two symbols contiguous to the L-SIG of the received signal. The 11bd device may perform a classification on the transmitted/received packet. For example, 11bd devices can detect NGV signals by using the constellation mapping.

Figure 26:
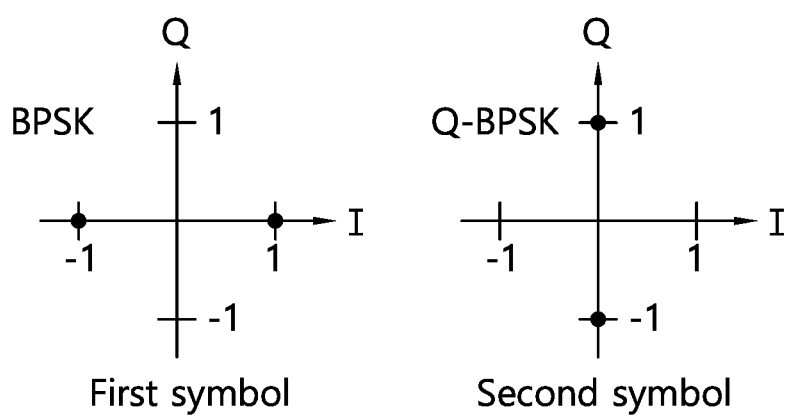
FIG. 26 shows an example of constellation mapping for two symbols in 11bd signal.

FIG. 26 shows an example of constellation mapping for two symbols in 11bd signal.

Referring to FIG. 26, constellation mapping for two symbols may be composed of the BPSK and Q-BPSK. For example, the constellation mapping of the first symbol may be configured with the BPSK. The constellation mapping of the second symbol may be configured with the Q-BPSK.

Figure 27:
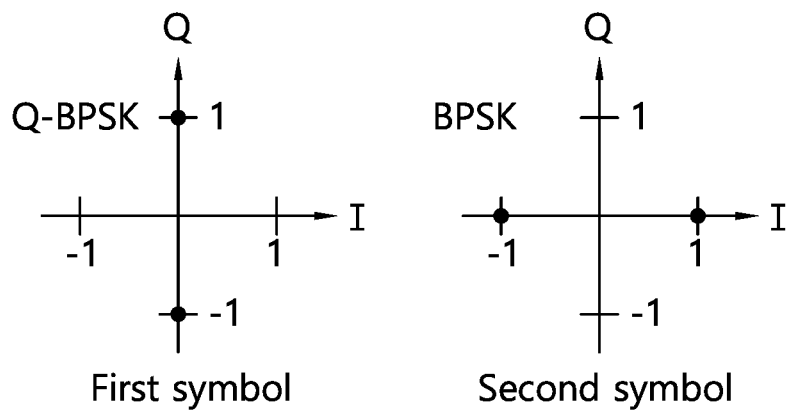
FIG. 27 shows another example of constellation mapping for two symbols in 11bd signal.

FIG. 27 shows another example of constellation mapping for two symbols in 11bd signal.

Referring to FIG. 27, constellation mapping for two symbols may consist of the Q-BPSK and the BPSK. For example, constellation mapping of the first symbol may be configured with the Q-BPSK. The constellation mapping of the second symbol may be configured with the BPSK.

Figure 28:
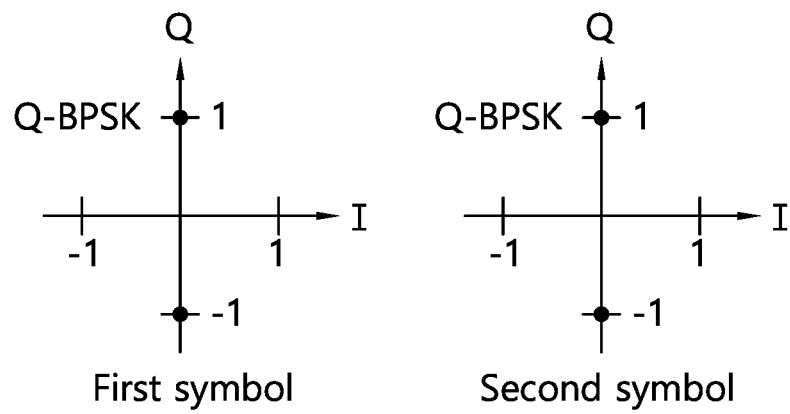
FIG. 28 shows another example of constellation mapping for two symbols in 11bd signal.

FIG. 28 shows another example of constellation mapping for two symbols in 11bd signal.

Referring to FIG. 28, constellation mapping for two symbols may be composed of Q-the BPSK and Q-BPSK. For example, constellation mapping of the first symbol may be configured with the Q-BPSK. The constellation mapping of the second symbol may also be configured with the Q-BPSK.

FIGS. 26 to 28, the 11bd device (i.e., the NGV device) may determine the NGV signal by using constellation mapping for two symbols. Accordingly, the probability of false detection may be lowered.

2-ii). When constellation for two symbols is used, three cases (FIGS. 26 to 28) may be considered except for the case of BPS K/BPSK. Therefore, unlike the packet classification (packet classification) using constellation mapping in FIGS. 26 to 28, the 11bd device may also perform an indication for a mode or a transport frame type/format of 11bd using the constellation mapping.

2-ii)-A. The mode or frame format according to the 802.11bd standard may be composed of a mode (or frame format) for a High Throughput (HT) and a mode (or frame format) for a Low Sensitivity (LS). The 11bd device may perform the indication for two modes (or frame format) as shown in Table 6 by using constellation mapping for two symbols.

TABLE 6

|  | Constellation mapping of two symbols for 11 bd HT | Constellation mapping of two symbols for 11 bd LS |
| --- | --- | --- |
| Case 1 | BPSK/QBPSK | QBPSK/BPSK |
| Case 2 | QBPSK/BPSK | BPSK/QBPSK |
| Case 3 | BPSK/QBPSK | QBPSK/QBPSK |
| Case 4 | QBPSK/QBPSK | QBPSK/QBPSK |
| Case 5 | QBPSK/BPSK | QBPSK/QBPSK |
| Case6 | QBPSK/QBPSK | QBPSK/BPSK |

Referring to Table 6, when the 11bd device uses Case 1, the 11bd device may measure/confirm constellation mapping for two symbols following the L-SIG in the received signal. When the constellation mapping for the two measured symbols is BPSK/QBPSK, the 11bd device can simultaneously confirm that the signal is an 11bd signal (or NGV signal) and a mode or frame format for the high throughput.

Figure 29:
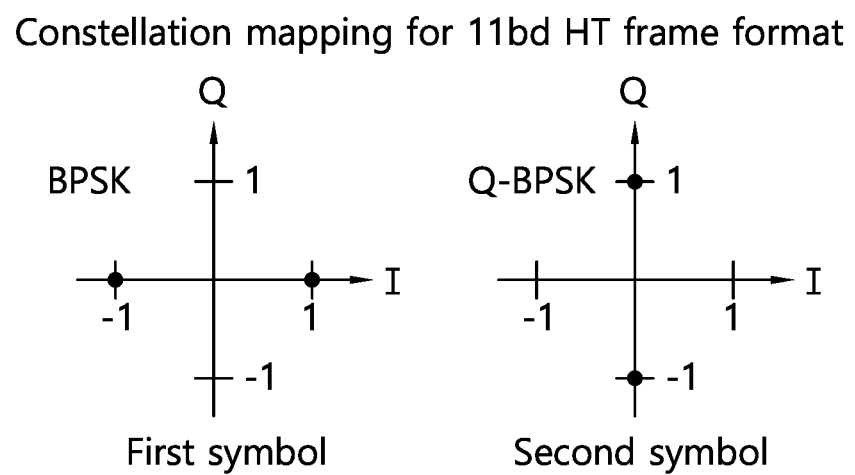
FIG. 29 shows another example of constellation mapping for two symbols in 11bd signal.

FIG. 29 shows another example of constellation mapping for two symbols in 11bd signal.

Referring to FIG. 29, in the 11bd signal according to Case 1 of Table 6, constellation mapping of two symbols is shown. Specifically, the constellation mapping for two symbols may be composed of the BPSK and Q-BPSK. For example, the constellation mapping of the first symbol may be configured with the BPSK. The constellation mapping of the second symbol may also be configured with the Q-BPSK. Accordingly, according to Case 1 of Table 6, the 11bd device may determine/identify that the received signal is an 11bd signal for the HT based on two symbols composed of the BPS K/Q-BPSK.

As described above, by performing a packet classification according to the 11bd standard and indication for the 11bd frame type or format simultaneously using the constellation mapping as described above, the 11bd device can perform an early indication of information related to the frame type or format and the 11bd mode. In addition, the 11bd device may not transmit additional information indicating information about the packet classification and 11bd frame type (or format) according to the 11bd standard. Accordingly, overhead for a physical layer (PHY) signaling field can be reduced.

The above-described two symbols may be at least one of the L-SIG and NGV-SIG, the NGV-SIG and OFDM symbol, or the one OFDM symbol and NGV-SIG. For example, the one OFDM symbol may be an RL-SIG in which the L-SIG is repeated.

2-ii)-B. The 11bd device may indicate information related to a bandwidth (BW) by using constellation mapping for two symbols.

For example, a signal in compliance with the 11bd standard for the high throughput (HT) may be transmitted through a 20 MHz bandwidth. In addition, a signal in compliance with the 11bd standard for the Low Sensitivity (LS) may be transmitted through a 10 MHz bandwidth. Therefore, the 11bd device can also transmit bandwidth information as shown in Table 7 by using the above-described method.

TABLE 7

| | Constellation mapping of two symbols for 11 bd HT and 20 MHz BW | Constellation mapping of two symbols for 11 bd LS and 10 MHz BW |
| --- | --- | --- |
| Case 1 | BPSK/QBPSK | QBPSK/BPSK |
| Case 2 | QBPSK/BPSK | BPSK/QBPSK |
| Case 3 | BPSK/QBPSK | QBPSK/QBPSK |
| Case 4 | QBPSK/QBPSK | QBPSK/QBPSK |
| Case 5 | QBPSK/BPSK | QBPSK/QBPSK |
| Case6 | QBPSK/QBPSK | QBPSK/BPSK |

As described above, the 11bd device can quickly inform information related to the 11bd standard signal transmission by using the constellation mapping. In addition, overhead for a physical layer (PHY) signaling field may be reduced.

2-ii)-C. According to an embodiment of detecting constellation mapping of two symbols, the probability of false detection can be reduced. Accordingly, according to the above-described embodiment, the 11bd device can reliably transmit information related to the packet classification according to the 11bd standard and information related to the 11bd frame type or format.

Second Embodiment—Method for Performing the Packet Classification Using Symbol Repetition A first legacy control field may be received through a first symbol. A second legacy control field may be received through a second symbol. The first symbol may be configured to be contiguous to the second symbol. The first legacy control field and the second legacy control field may include the same bit information. Hereinafter, a specific embodiment constituting the first legacy control field and the second legacy control field may be described. The above-described first legacy control field may include an L-SIG. The above-described second legacy control field may include an RL-SIG. For convenience of description, the first legacy field may be described through the L-SIG, which is an example of the first legacy field. Also, the second legacy field may be described through the RL-SIG, which is an example of the second legacy field.

1. Method to perform an indication by configuring the L-SIG to repeat 1-i). According to the 11bd standard, the L-SIG may be repeatedly transmitted immediately after the L-SIG. In this case, the 11bd device may indicate that the signal complies with the 802.11bd standard by using whether the L-SIG is repeated.

1-i)-A. The repeated L-SIG (i.e., RL-SIG) based on the above-described embodiment may be configured as follows.

1-i)-A-a. The repeated L-SIG (i.e., RL-SIG) may be composed of a complementary bit of the L-SIG data bit. For example, if 24 data bits of the L-SIG are configured as (1 1 0 1 1 1 0 1 0 . . . 1 1 0), data bits of RL-SIG may be set to (0 0 1 0 0 0 1 0 1 . . . 0 0 1). Accordingly, the Euclidean distance between the L-SIG and the RL-SIG may be maximized.

1-i)-A-b. The RL-SIG can be configured by using the data bits of the L-SIG and the data bits generated through an XOR (eXclusive OR) operation of a specific (or designated) bit/sequence. For example, a specific (or designated) bit may consist of 1 bit (e.g., {1} or {0}). The RL-SIG may be configured by using the data bit generated through the XOR operation of the 1 bit and the L-SIG data bit.

1-i)-A-c. The RL-SIG can be configured by using data bits generated through an XOR operation with a sequence having 24/12 bits. For example, when the 12-bit sequence is used for the XOR operation, the 12-bit sequence may be configured as [1 0 0 0 0 1 0 1 0 1 1 1]. As another example, the 24-bit sequence may be generated by repeating the 12-bit sequence. As another example, the 24-bit sequence may be configured as a sequence that minimizes a Peak to Average Power Ratio (PAPR).

1-i)-A-d. The RL-SIG is configured by performing BPSK modulation using the same data as the L-SIG, multiplying the modulated signal by a specified value (e.g., {-1}), and performing carrier mapping of the multiplied results.

1-i)-A-e. The RL-SIG may be generated by multiplying the L-SIG generated in the time domain by a specified value (e.g., {-1}/{i}/{-i}). A frame may be configured through the generated RL-SIG.

1-i)-A-f. The RL-SIG may be configured in the same way as the L-SIG. The 11bd device may determine/determine that the received signal is an 11bd signal through a repetition check and a contents-check for the L-SIG.

1-i)-B. When the RL-SIG is configured in the same way as the L-SIG, detection of a PPDU according to the 802.11bd standard may be performed as follows.

1-i)-B-a. The QBPSK modulation can be applied to the RL-SIG.

1-i)-B-b. The 11bd device may perform a phase check for the RL-SIG. For example, in this case, the 11bd device may determine that the phase of the RL-SIG is QBPSK.

1-i)-B-c. Thereafter, the 11bd device may determine whether the received signal is the 11bd signal through the repetition check and the contents check. For example, the 11bd device may determine whether the RL-SIG includes the same bit information as the L-SIG.

1-i)-B-d. The 11bd device can reduce false detection error by sequentially performing the phase check and the repetition check.

1-i)-C. The 11bd device may indicate the mode, frame format, or frame type for the 11bd signal by using whether the L-SIG is repeated identically or differently.

1-i)-C-a. The 11bd device may configure a frame based on a structure in which L-SIG is repeatedly transmitted. The 11bd device may not repeatedly transmit the L-SIG for the frame format/type for the High Throughput (HT). The 11bd device may repeatedly transmit the L-SIG for a frame format/type for the low sensitivity (LS). Accordingly, the 11bd device can perform a packet classification and a frame format/type indication at the same time.

According to an embodiment, the 11bd device may indicate that the mode of the 11bd signal is the HT by using a repeated L-SIG configuration. In addition, the 11bd device may indicate that the mode of the 11bd signal is the LS by using the L-SIG and the RL-SIG configured in different formats. According to an embodiment, the 11bd device may apply the embodiments of 1-i) to L-SIGs configured in different formats. According to an embodiment, the 11bd device may indicate the format for the HT and the LS using constellation (e.g., QPSK) of the RL-SIG.

1-i)-C-b. Unlike the above-described embodiment, a signal (or PPDU) according to the 802.11bd standard may be configured based on a single format. The 11bd device may indicate various information through a method of repeating the L-SIG. For example, the 11bd device may perform an early indication of information related to bandwidth (BW), mid-amble, LTF configuration, coding through the method of repeating the L-SIG, etc.

2. Method of Configuring Two OFDM Symbols Repeated after L-SIG 2-i). The 11bd device may perform a repetition check of two symbols transmitted after the L-SIG. The 11bd device may perform a packet classification on a received signal received through the repetition check. For example, if the 11bd device determines that two symbols are repeated after the L-SIG symbol, the 11be device may recognize/determine the received signal as the 11bd signal. As an example, the repeated symbol may be composed of the NGV-SIG and OFDM symbol (i.e., early indication or signature sequence).

2-ii). As in the above-described embodiment of 1-i)-C, the 11bd device may indicate the frame format, type, or mode for the 11bd by using whether the symbol repeated after the L-SIG is repeated identically or differently.

2-ii)-A. For example, a frame according to the 802.11bd standard may have a structure in which the same symbol is repeated. The frame format or type for the HT may be set not to repeat the same two symbols being contiguous to the L-SIG. The frame format or type for the LS may be set so that two symbols being contiguous to the L-SIG are identically repeated. Accordingly, the 11bd device may simultaneously perform a packet classification and a frame format or type indication.

2-ii)-B. The above-described example of 2-ii)-A may be one embodiment. According to an embodiment, the frame format or type for the HT may be configured with the same repeated symbols. In addition, the frame format or type for the LS may be composed of repeated symbols in different formats.

2-iii). The 11bd device may indicate a bandwidth as well as a frame format or type by using the above-described symbol repetition.

For example, a frame according to the 802.11bd standard may be configured in a structure in which the same symbol is repeatedly transmitted. The frame format or type for the HT and 20 MHz bandwidth may be configured such that symbols do not repeat identically. The frame format or type for the LS and 10 MHz bandwidth can be configured to repeat the symbols identically. Therefore, the 11bd device may perform a packet classification and a frame format or type indication at the same time. The above-described example is only one example, and the 11bd device may indicate opposite to the above-described example.

Third Embodiment—Method for Indicating Frame Format or Type Using a Signature Sequence 1. The 11bd frame may be configured to include one OFDM symbol for packet classification after the L-SIG. In this case, the symbol may be composed of a signature sequence.

2. A signature symbol can be configured using the following signature sequence for fast detection.

2-i). The signature sequence can be configured by applying BPSK modulation.

2-ii). The signature sequence may include a time sequence or a frequency sequence.

2-iii). The signature symbol may be configured as a conventional OFDM symbol. Accordingly, the signature symbol can be transmitted by using a variable number of subcarriers. For example, the signature symbol may be transmitted by using 52 subcarriers. For signature sequence mapping to available tones, the signature sequence may consist of a sequence of length 52.

Example 1

Signature sequence = $[s1s2s3s4s5...S50s51s52]$

The above 52-bit sequence may be divided into a left 26-bit sequence (signature sequence_left_26) and a right 26-bit sequence (signature sequence_right_26).

That is, it can be defined as follows.

Example 2

Signature_sequence_right_26 = $\{s1s2...s25, s26\}$

Signature_sequence_right_26 = $\{s27s28...s51s52\}$ 2-iv). Based on Example 2, the configuration of the signature symbol including DC component(s) in the frequency domain may be configured as in Example 3 below.

Example 3

Signature symbol = $\{000000$ signature sequence_left_260 signature sequence_right_2600000$\}$ That is, as in Example 3, 6 left guards and 5 right guards may be inserted into the signature symbol, and a left 26-bit sequence and a right 26-bit sequence may be included on the left/right side based on the DC component(s) on the frequency band.

2-v). The sequence of Example 1 may be used for packet indication. That is, the sequence of Example 1 may be used to identify the type of PPDU. For example, the signature sequence may be used to distinguish two packets. As an example, the signature sequence may be referred to as S. The complementary sequence for S may be referred to as S. In order to distinguish the two packets, a symbol of the packet may be composed of S and S*.

In other words, the sequence of Example 1 may be used to indicate a PPDU of a first type (e.g., a PPDU according to the 802.11p standard) and a PPDU of a second type (e.g., a PPDU according to the 802.11bd specification). For example, Example 1 may be used to indicate the PPDU of the first type, and the complementary sequence for Example 1 may be used to indicate the PPDU of the second type. That is, the receiving STA (e.g., 11bd device) can identify/determine that the received PPDU is the first type PPDU when the sequence of Example 1 is received, and the receiving STA can identify/determine that the received PPDU is the second type PPDU when the complementary sequence of Example 1 is received.

2-vi). Since the sequence mapping in the time domain does not need to consider the DC component, the signature sequence may consist of a sequence having a length of 53.

The Signature Symbol may be generated based on the following 53-bit sequence and 6 left guards and 5 right guards.

Example 4

$$\text{signature\_sequence\_53} = \{s1s2s3s4s5\ldots S50s51s53\}$$

$$\text{Signature symbol} = \{00000 \text{ Signature sequence\_53}00000\}$$

2-vii). According to another example, the signature sequence may consist of 26 sequences. In addition, the signature sequence for 10 MHz may be configured as in Example 5.

Example 5

$$\text{signature\_seq\_26} = \{s1s2s3s4s5\ldots s24s25s26\}$$

The signature symbol may be generated based on the 26-bit sequence, 6 left guards, and 5 right guards as in Example 5.

For example, the signature symbol may be configured as in Example 6 in the frequency domain.

Example 6

Signature symbol ==

{000000signature_seq_260signature_seq_260signature_seq_2600000}

As another example, the signature symbol in the time domain may be configured as in Example 7.

Example 7

Signature symbol ==

{000000signature_seq_260signature_seq_260signature_seq_2600000}

2-viii). The signature symbol of the present specification may be configured in various ways using a 26-bit sequence. For example, the signature symbol in consideration of a Peak to Average Power Ratio (PAPR) may be configured in various ways in the frequency or time domain as in Example 8.

Example 8

Signature symbol =

{000000signature_seq_260(signature_seq_26)∗(−1)00000}

Signature symbol =

{000000signature_seq_26∗(−1)(signature_seq_26)00000}

Signature symbol = {000000(signature_seq_26)0

(complementary sequences of signature_seq_26)00000}

2-iX). According to an embodiment, a 26-bit signature sequence may be mapped to the frequency domain at an interval of 2 tones. That is, the transmitting STA (e.g., 11bd device) may allocate each component of the above-described 26-bit sequence only to an odd subcarrier index or an even subcarrier index. In this case, since the final signal to which IFFT/IDFT is applied is repeated in the time domain for one symbol period (e.g., 4 μs), the receiving STA (e.g., the 11bd device) may easily determine the type of the received signal (or PPDU) using the repeated signal pattern.

2-X). The length of the above-described signature sequence is only an example, and the signature sequence may have various lengths. Also, the signature sequence may be composed of a combination of sequences having a hamming distance equal to or greater than a threshold of hamming distance.

2-Xi). The above-described signature sequence may be composed of a conventional Pseudo Noise (PN)-sequence/Maximum Length (ML) sequence/orthogonal sequence/Golay code. For example, when the length of the conventional sequence is odd, 0 or 1 may be added to the conventional odd sequence to generate an even-length signature sequence. In this case, the added 0 or 1 may be added to make the number of 0s and 1s in the sequence equal.

3. When the packet classification is performed using the signature sequence, the signature sequence can be configured as shown in Table 8 to simultaneously provide information related to the packet classification and the frame type or format.

TABLE 8

| Signature sequence for 11 bd HF | Signature sequence for 11 bd LS |
|---|---|
| S1 | S2 |

In Table 8, S1 and S2 may be different sequences. The S2 may be a complementary sequence of the signature sequence S1.

4. The 11bd device may additionally indicate, through the signature sequence, information related to the bandwidth through which the 11bd signal (or PPDU) is transmitted as well as the frame format or type. For example, the signature sequence may be configured as shown in Table 9.

TABLE 9

| Signature-sequence for 11 bd HT and 20 MHz | Signature sequence for 11 bd LS and 10 MHz |
|---|---|
| S1 | S2 |

In Table 9, S1 and S2 may be different sequences. The S2 may be a complementary sequence of the sequence S1.

5. Unlike the above-described embodiment, the 11bd device may indicate the frame format or type by setting an individual signature sequence. Table 10 may be a table for explaining an example of the individual sequence.

TABLE 10

| Signature sequence index | Contents |
|---|---|
| 1 | 10 MHz + LS |
| 2 | 10 MHz + HT |
| 3 | 20 MHz + LS |
| 4 | 20 MHz + HT |

Referring to Table 10, the 11bd device may use after setting two sequences instead of four sequences for frame type or format indication. In this case, a complementary sequence of the signature sequence may be used according to the bandwidth or frame type or format.

Fourth Embodiment—Method of Indicating a Frame Format or Type Using the Content of an Early Indication Symbol 1. In an 11bd signal (or PPDU according to 802.11bd standard), "one OFDM symbol" for packet classification may be configured after the L-SIG. The 11bd device may indicate, through the "one OFDM symbol," information related to the packet classification and frame format, type, or mode. In addition, the 11bd device may also indicate information related to the bandwidth through the information of the "one OFDM symbol." As an example, the "one OFDM symbol" may consist of the NGV-SIG.

Fifth Embodiment—Method of Classifying Packets Using Extra Tone

1. The 11bd device may perform a packet classification for the 11bd by using the extra 4 tones included in the L-SIG. The 11bd device may detect a packet based on information included in the extra 4 tones.

1-i). The same power as the L-LTF may be applied to the extra 4 tones included in the L-SIG. Accordingly, the 11bd device may determine whether an 11bd signal (or frame) is present by using the average power of the extra 4 tones. The 11bd device may determine the received signal as the 11bd signal when the average power of the extra 4 tones exceeds a predetermined threshold in the received signal. For example, during transmission, power of each tones may be p', and the average tone power of the extra 4 tones may also be p'. Therefore, when the average power for the extra 4 tones of the L-SIG of the received signal is p'*0.7 or higher, the device may recognize the received signal as an 11bd signal. The threshold value p'*0.7 is only one example, and the threshold value may be set to various values such as p'*0.5 or more.

1-ii). The 11bd device may check/determine information related to the packet classification based on information carried (or included) in extra 4 tones included in L-SIG.

1-ii)-A. The 11bd device may check/determine information related to the packet classification by using a coefficient value included in the extra 4 tones. For example, the 11bd device may check/determine information related to the packet classification based on the extra 4 tones including 4 specific coefficient values.

1-ii)-B. A sequence having a length of 4 may be used for the coefficient value. The above-described sequence may be composed of PN-sequence/ML sequence/orthogonal sequence/Golay code, and the like.

1-ii)-C. The 11bd device may indicate information related to the 11bd frame type or format by using the sequence. In addition, the 11bd device may individually indicate information related to the 11bd frame type or format and bandwidth.

Fifth Embodiment—Method of Indicating Frame Format or Type Using Content of L-SIG The 11bd device may indicate packet information through a reserved bit of the conventional L-SIG. For example, the 11bd device may use reserved bit 4 of the L-SIG. The 11bd device may transmit after setting the reserved bit 4 to a specific value (e.g., {1}) when transmitting the 11bd packet to indicate the 11bd packet (or the 11bd signal). Also, from a reception point of view, the 11bd device may check/determine a value set in reserved bit 4 of the L-SIG included in the received packet. The 11bd device may determine whether the received packet is an 11bd packet or an 11p packet based on the reserved bit 4. According to the fifth embodiment, the conventional PPDU (e.g., 11p PPDU) may not be changed. Also, the 11bd device may check whether it receives the 11bd packet or the 11p packet based on the received packet.

Figure 30:
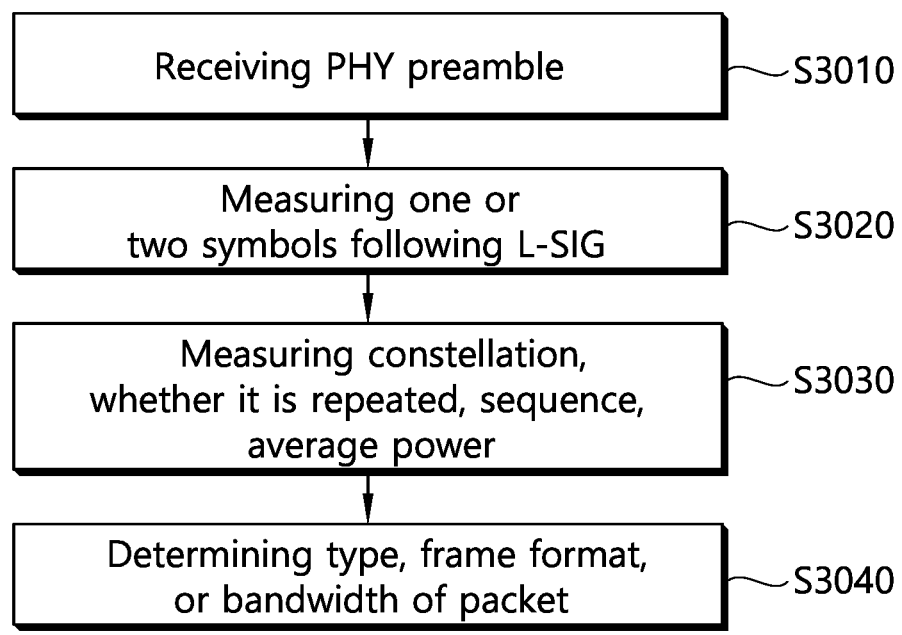
FIG. 30 is a flowchart illustrating an example of an operation for identifying a packet in a receiving STA.

FIG. 30 is a flowchart illustrating an example of an operation for identifying a packet in a receiving STA.

Referring to FIG. 30, in S3010, a receiving device (e.g., 11bd device) may receive a physical layer (PHY) preamble. That is, the receiving device may receive the PPDU. The receiving device may check/identify the PHY preamble included in the received packet (or PPDU). The PHY preamble may include various fields. For example, the PHY preamble may include fields such as the L-STF, L-LTF, L-SIG, NGV-SIG, and data field.

In S3020, the receiving device may measure/verify/identify one or two symbols following the L-SIG. The receiving device may measure/confirm/identify one or two symbols following the L-SIG.

In S3030, the receiving device may determine the type, frame format, or bandwidth of the received packet. The above-described first to fifth embodiments may be used as a method for the receiving apparatus to determine the received packet type, frame format, or bandwidth. For example, according to the first embodiment, the receiving device may measure/confirm/identify two symbols that follow the L-SIG. For example, in Case 1 of Table 6, when the first symbol of the two symbols is configured with the BPSK and the second symbol is configured with the QBPSK, the receiving device may identify that the received packet is an 11bd packet for the HT. Also, when the first symbol is configured with the QBPSK and the second symbol is configured with the BPSK, the receiving apparatus may identify that the received packet is an 11bd packet for the LS.

Figure 31:
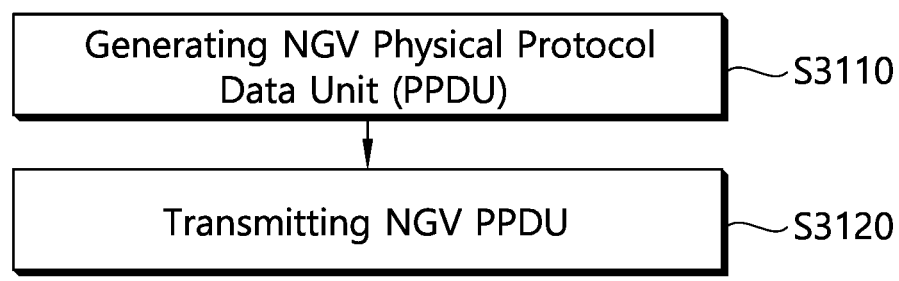
FIG. 31 is a flowchart for explaining the operation of a transmitting STA.

FIG. 31 is a flowchart for explaining the operation of a transmitting STA.

Referring to FIG. 31, in S3110, a transmitting STA (e.g., 11bd device) may generate an NGV Physical Protocol Data Unit (PPDU). The STA may generate an NGV PPDU including a legacy training field, a first legacy control field, a second legacy control field, a Next Generation Vehicular network (NGV) control field, and an NGV data field.

The legacy training field may include the L-STF and/or L-LTF. The first legacy control field may include the L-SIG. The second legacy control field may include the RL-SIG.

The first legacy control field may be transmitted through a first symbol and the second legacy control field may be transmitted through a second symbol. Also, the first symbol may be configured to be continuous with the second symbol. Also, the first legacy control field and the second legacy control field may include the same bit information.

According to an embodiment, the transmitting STA may modulate the first legacy control field based on a first constellation. Also, the transmitting STA may modulate the second legacy control field based on the second constellation. In this case, the NGV PPDU may include information related to a first mode. For example, the transmitting STA may modulate the first legacy control field based on the BPSK. The transmitting STA may modulate the second legacy control field based on the Q-BPSK. In this case, the NGV PPDU may include information related to a mode for the High Throughput (HT).

According to an embodiment, the transmitting STA may modulate the first legacy control field based on a second constellation. Also, the transmitting STA may modulate the second legacy control field based on the first constellation. In this case, the NGV PPDU may include information related to the second mode. For example, the transmitting STA may modulate the first legacy control field based on the Q-BPSK. The transmitting STA may modulate the second legacy control field based on the BPSK. In this case, the NGV PPDU may include information related to a mode for the low sensitivity (LS).

In S3120, the transmitting STA may transmit an NGV PPDU. The NGV PPDU may be transmitted through a 5.9 GHz band based on a frequency spacing of 156.25 kHz.

The legacy training field, the first legacy control field, and the second legacy control field of the NGV PPDU may be transmitted through the same subcarrier index range. For example, the subcarrier index range may be set to a subcarrier index of −26 (minimum) to a subcarrier index of +26 (maximum).

Figure 32:
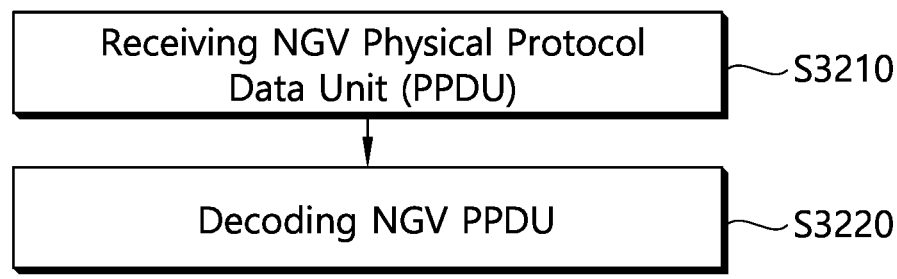
FIG. 32 is a flowchart illustrating an operation of a receiving STA.

FIG. 32 is a flowchart illustrating an operation of a receiving STA.

Referring to FIG. 32, in S3210, a receiving STA (e.g., 11bd device) may receive an NGV Physical Protocol Data Unit (PPDU).

The receiving STA may receive an NGV Physical Protocol Data Unit (NGV PPDU) including a legacy training field, a first legacy control field, a second legacy control field, a Next Generation Vehicular network (NGV) control field, and an NGV data field.

The legacy training field may include the L-STF and/or L-LTF. The first legacy control field may include the L-SIG. The second legacy control field may include the RL-SIG.

The receiving STA may receive the NGV PPDU through a 5.9 GHz band based on a frequency spacing of 156.25 kHz.

The receiving STA may receive the first legacy control field through the first symbol. The receiving STA may receive the second legacy control field through the second symbol. Also, the first symbol may be consecutive to the second symbol. Also, the first legacy control field and the second legacy control field may include the same bit information.

The receiving STA may receive the legacy training field, the first legacy control field, and the second legacy control field through the same subcarrier index range. For example, the receiving STA may receive the first legacy control field and the second legacy control field through a subcarrier index range set to a subcarrier index of −26 (minimum) to a subcarrier index of +26 (maximum).

In S3220, the receiving STA may decode the NGV PPDU.

According to an embodiment, the receiving STA may perform a first process of determining whether the first legacy control field and the second legacy control field are modulated based on the same constellation. Thereafter, the receiving STA may perform a second process of determining whether the first legacy control field and the second legacy control field include the same bit information. The receiving STA may obtain information related to the type of the NGV PPDU based on the first process and the second process.

According to an embodiment, the receiving STA may perform a third process of determining whether the first legacy control field and the second legacy control field are modulated based on different constellations. The receiving STA may obtain information related to the type of the NGV PPDU based on the third process.

For example, a first legacy control field is modulated based on a first constellation (e.g., BPSK), and the second legacy control field is modulated based on a second constellation (e.g., Q-BPSK). In this case, the NGV PPDU may include information related to a first mode. In addition, when the first legacy control field is modulated based on the second constellation and the second legacy control field is modulated based on the first constellation, the NGV PPDU may include information about a second mode.

The first mode may include a mode for transmitting the NGV PPDU with high throughput. The second mode may include a mode for transmitting the NGV PPDU with low sensitivity.

The foregoing technical features of this specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claim of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method in a wireless local area network (WLAN) system, the method comprising:
   receiving a Next Generation Vehicular network (NGV) Physical Protocol Data Unit (PPDU) including a legacy training field, a first legacy control field, a second legacy control field, an NGV control field, and an NGV data field; and
   decoding the NGV PPDU, wherein the NGV PPDU is received through a 5.9 GHz band based on a frequency spacing of 156.25 kHz,
   wherein the first legacy control field is received through a first symbol, the second legacy control field is received through a second symbol, and the first symbol is contiguous to the second symbol, and
   wherein the first legacy control field and the second legacy control field include same bit information.

2. The method of claim 1, wherein the legacy training field, the first legacy control field, and the second legacy control field are received through a same subcarrier index range.

3. The method of claim 2, wherein subcarrier index range is set to a subcarrier index of −26 to a subcarrier index of +26.

4. The method of claim 1, further comprising:
   performing a first process of determining whether the first legacy control field and the second legacy control field are modulated based on a same constellation;
   performing a second process of determining whether the first legacy control field and the second legacy control field include same bit information; and
   based on the first process and the second process, obtaining information related to a type of the NGV PPDU.

5. The method of claim 1, further comprising:
   performing a third process of determining whether the first legacy control field and the second legacy control field are modulated based on different constellations; and
   based on the third process, obtaining information related to a type of the NGV PPDU.

6. The method of claim 5, when the first legacy control field is modulated based on a first constellation and the second legacy control field is modulated based on a second constellation, wherein the NGV PPDU includes information related to a first mode, and
   when the first legacy control field is modulated based on the second constellation and the second legacy control field is modulated based on the first constellation, wherein the NGV PPDU includes information related to a second mode.

7. The method of claim 6, wherein the first mode includes a mode for transmitting the NGV PPDU with a high throughput, and
   wherein the second mode includes a mode for transmitting the NGV PPDU with a low sensitivity.

8. The method of claim 1, wherein the first legacy control field includes a legacy-signal (L-SIG), and the second legacy control field includes a repeated L-SIG (RL-SIG).

9. A station in a wireless local area network (WLAN) system, the station comprising:
   a memory configured to store a received Physical Protocol Data Unit (PPDU); and
   a processor configured to control the memory:
   wherein the processor is further configured to:
      receive a Next Generation Vehicular network (NGV) Physical Protocol Data Unit (PPDU) including a legacy training field, a first legacy control field, a second legacy control field, an NGV control field, and an NGV data field; and
      decode the NGV PPDU,
      wherein the NGV PPDU is received through a 5.9 GHz band based on a frequency spacing of 156.25 kHz,
      wherein the first legacy control field is received through a first symbol, the second legacy control field is received through a second symbol, and the first symbol is contiguous to the second symbol, and
      wherein the first legacy control field and the second legacy control field include same bit information.

10. The station of claim 9, wherein the legacy training field, the first legacy control field, and the second legacy control field are received through a same subcarrier index range.

11. The station of claim 10, wherein the wherein subcarrier index range is set to a subcarrier index of −26 to a subcarrier index of +26.

12. The station of claim 9, wherein the processor is further configured to:
perform a first process of determining whether the first legacy control field and the second legacy control field are modulated based on a same constellation;
perform a second process of determining whether the first legacy control field and the second legacy control field include same bit information; and
based on the first process and the second process, obtain information related to a type of the NGV PPDU.

13. The station of claim 9, wherein the processor is further configured to:
perform a third process of determining whether the first legacy control field and the second legacy control field are modulated based on different constellations; and
based on the third process, obtain information related to a type of the NGV PPDU.

14. The station of claim 13, when the first legacy control field is modulated based on a first constellation and the second legacy control field is modulated based on a second constellation, wherein the NGV PPDU includes information related to a first mode, and
when the first legacy control field is modulated based on the second constellation and the second legacy control field is modulated based on the first constellation, wherein the NGV PPDU includes information related to a second mode.

15. The station of claim 13, wherein the first mode includes a mode for transmitting the NGV PPDU with a high throughput, and
wherein the second mode includes a mode for transmitting the NGV PPDU with a low sensitivity.

16. The station of claim 9, wherein the first legacy control field includes a legacy-signal (L-SIG), and the second legacy control field includes a repeated L-SIG (RL-SIG).

* * * * *